United States Patent
Hsueh et al.

(10) Patent No.: US 11,520,104 B2
(45) Date of Patent: Dec. 6, 2022

(54) ROBUST CONJUGATED-SYMMETRIC OPTICAL APPARATUS AND DESIGN METHOD THEREOF

(71) Applicant: National Taiwan University, Taipei (TW)

(72) Inventors: Wen-Jeng Hsueh, Taipei (TW); Yu-Chuan Lin, Taipei (TW); Shih-Han Chou, Taipei (TW)

(73) Assignee: National Taiwan University, Taipei (TW)

( * ) Notice: Subject to any disclaimer, the term of this patent is extended or adjusted under 35 U.S.C. 154(b) by 120 days.

(21) Appl. No.: 17/148,801

(22) Filed: Jan. 14, 2021

(65) Prior Publication Data

US 2021/0223472 A1 Jul. 22, 2021

Related U.S. Application Data

(60) Provisional application No. 62/961,716, filed on Jan. 16, 2020.

(51) Int. Cl.
*G02B 6/12* (2006.01)
*G02B 27/00* (2006.01)
(Continued)

(52) U.S. Cl.
CPC ......... *G02B 6/12007* (2013.01); *G02B 1/005* (2013.01); *G02B 6/12004* (2013.01); *G02B 27/0012* (2013.01); *G02B 6/29343* (2013.01)

(58) Field of Classification Search
CPC .. G02B 6/12; G02B 6/12007; G02B 6/12004; G02B 27/0012
See application file for complete search history.

(56) References Cited

U.S. PATENT DOCUMENTS

2009/0304327 A1\* 12/2009 Green ................. G02B 6/3596
 385/16
2021/0223472 A1\* 7/2021 Hsueh ................. G02B 6/1225

OTHER PUBLICATIONS

Lin et al. "Tunable light absorption of graphene using topological interface states" Optics Letters; vol. 45, No. 16 / Aug. 15, 2020. pgs. 4.

(Continued)

*Primary Examiner* — Tina M Wong
(74) *Attorney, Agent, or Firm* — Allen, Dyer, Doppelt + Gilchrist, PA

(57) ABSTRACT

A robust conjugate symmetric optical apparatus is disclosed. The robust conjugate symmetric optical apparatus comprises a first optical cell set and a second optical cell set. The first optical cell set includes a first plurality of cells, each of which includes a first left half cell and a first right half cell, and the respective first right half cell and the corresponding first left half cells form a first symmetric structure therebetween. The second optical cell set includes a second plurality of cells, each of which includes a second left half cell and a second right half cell, and the respective second right half cell and the corresponding second left half cells form a second symmetric structure therebetween, wherein each of the first left half cells of the first optical cell set and each of the second right half cells of the second optical cell set have the same structure; and each of the first right half cells of the first optical cell set and each of the second left half cells of the second optical cell set have the same structure.

20 Claims, 23 Drawing Sheets

(51) Int. Cl.
    *G02B 1/00*     (2006.01)
    *G02B 6/293*    (2006.01)

(56) References Cited

OTHER PUBLICATIONS

Lin et al. "Robust high-Q filter with complete transmission by conjugated topological photonic crystals" Scientific Reports; www.nature.com/scientificreports (2020) 10:7040; p. 7.

* cited by examiner

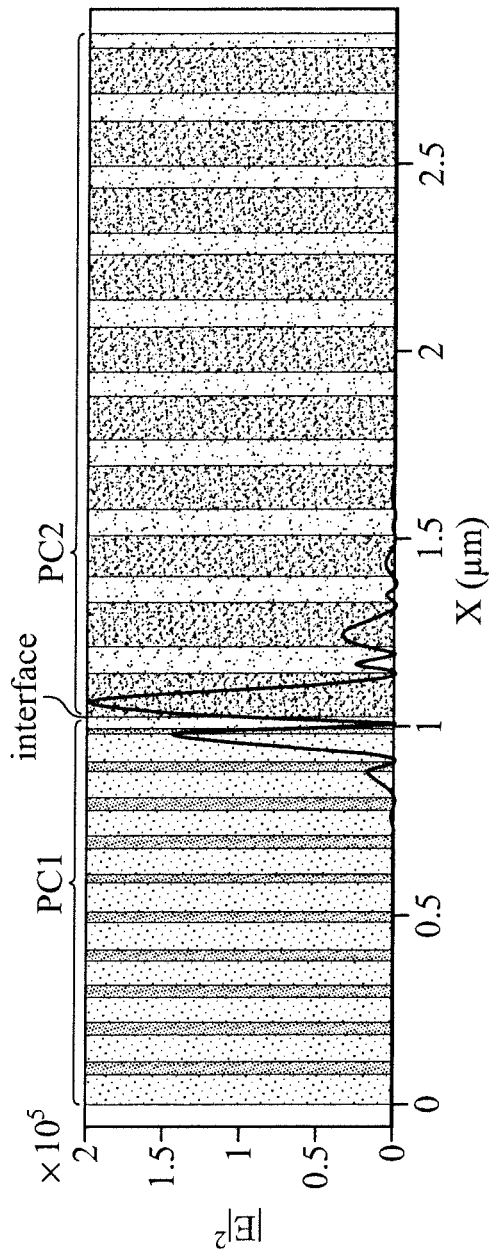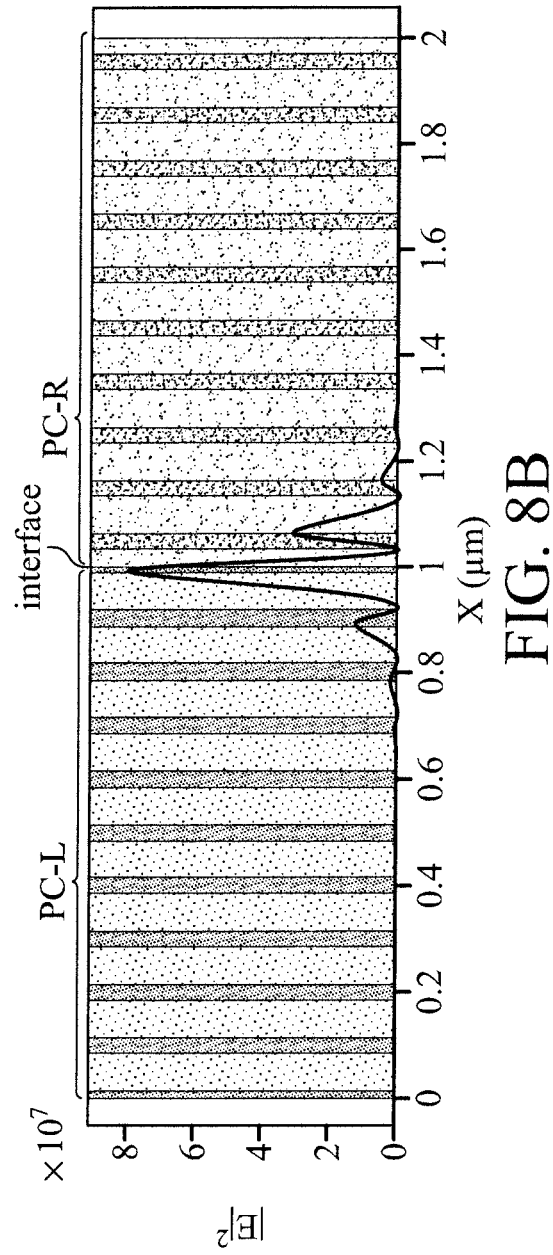
FIG. 8A
FIG. 8B

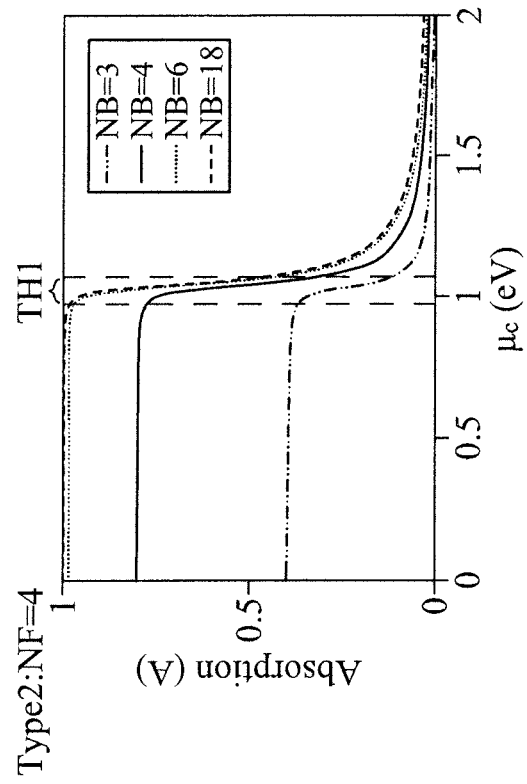
FIG. 18A
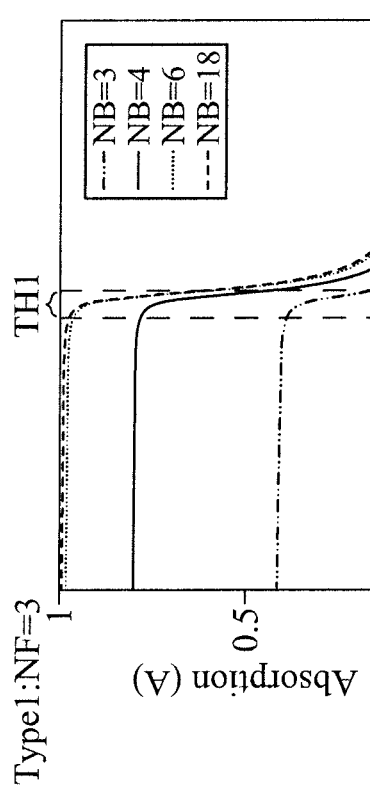
FIG. 18B
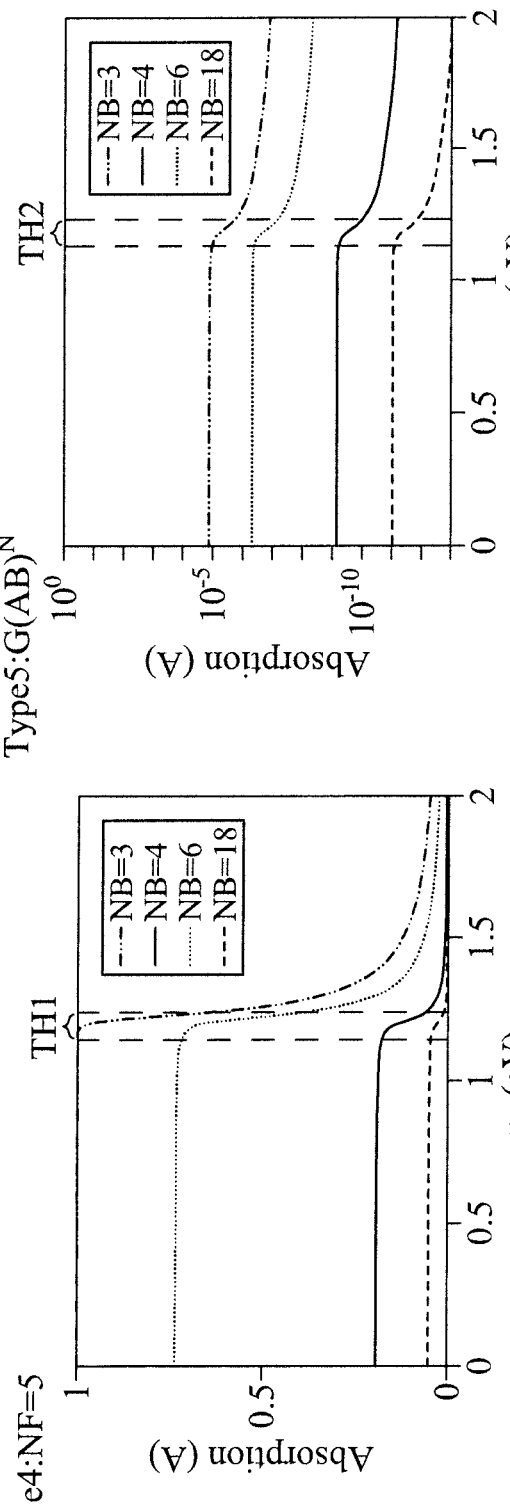
FIG. 18C
FIG. 18D

ROBUST CONJUGATED-SYMMETRIC OPTICAL APPARATUS AND DESIGN METHOD THEREOF

CROSS-REFERENCE TO RELATED APPLICATION AND CLAIM OF PRIORITY

This application claims the benefit of U.S. Provisional Applications No. 62/961,716, filed on Jan. 16, 2020; Yu-Chuan Lin, Shih-Han Chou & Wen-Jeng Hsueh, Robust high-Q filter with complete transmission by conjugated topological photonic crystals, (2020), Scientific reports, Vol. 10, No. 7040, https://doi.org/10.1038/s41598-020-64076-3; Published online: Apr. 27, 2020; Y. C. Lin, S. H. Chou, and W. J. Hsueh, Tunable light absorption of graphene using topological interface states, (2020) Optics Letters, Vol. 45, No. 16, pp. 4369, published August 2020; Unpublished paper: Conjugated topological interface-states in coupled ring resonators (Inventor: Y C. Lin, B. Y. Chen and W. J. Hsueh), the disclosures of which are incorporated herein in their entirety by reference.

FIELD OF THE INVENTION

The invention relates to a robust conjugated-symmetric optical apparatus, and particularly relates to a robust conjugated-symmetric optical apparatus having a special configuration, and a design method for the robust conjugated-symmetric optical apparatus.

BACKGROUND OF THE INVENTION

Optical devices having high-performance resonators or high-penetration filters are required in various applications in various physics and engineering fields, such as resonators, filters, light sources, optical switches, modulators, Sensors, communications, and quantum information processing, etc.

Traditionally, producing high-performance resonators or filters are usually based on Fabry-Perot resonators, and they are usually made of symmetric Bragg mirrors and cavities. Although they have high Q values, the function may be reduced due to changes in the environment, material variations, or manufacturing defects, resulting in the performance or specification changes of the resonator. Therefore, when implementing these applications, it has a critical influence on achieving high quality factor, high transmittance and small size optical crystal structure without being affected by the environment or manufacturing defects, which may reduce the function, or cause changes in the performance or specifications of the resonator. It is especially important for the resonator to have robustness and be of high quality, and for the optical crystal or waveguide structure to have a filtering function. Until now, such a technical solution that can simultaneously achieve the integration of the above-mentioned functions has not yet been proposed. Therefore, continuous efforts to strengthen the quality factor and maintain high performance without being affected by the environment or manufacturing defects that reduce the function or cause changes in the performance or specifications of the resonator are the main issues to overcome in order to achieve excellent optical performance.

Traditional two-dimensional columnar topological photonic crystals or one-dimensional layered topological photonic crystals are less affected by the use environment or manufacturing defects, resulting in reduced functions or changes in the performance or specifications of the resonator, and the quality factor Q value decreases. Therefore, if an optical apparatus having a specific optical structure or topological configuration can be designed to have a high Q value and high performance, while being able to overcome the influence of the environment or manufacturing defects, it will be an improvement.

In the prior art Y. Ota, et al., "Active topological photonics", Nanophotonics 9, 547-567 (2020), the topological quantum well micropillar resonator mentioned in the prior art consists of a set of SSH (SSH, Su-Schrieffer-Heeger active micro ring resonator arrays) structure model constituting the active quantum well micro column resonator array 10 (as shown in FIGS. 1A and 1B) and the micro ring array 12 (as shown in FIG. 2), the arrays 10, 12 are composed of 16 coupled micro-pillar resonators 101 and micro-ring resonators 121 of the same size fabricated on an InGaAsP quantum well QW. The topological configuration is as shown in the first figure B. The topological configuration TPL of one-dimensional linear arrangement ABAB . . . BAB is formed for N AB periodic topological configurations TP1~TPN. Its topological characteristic principle mainly comes from the excitation of SSH model alternate coupling sequence arrangement, quantum well QW. The interval $K1$, $K2$ . . . $K(2N-1)$ between neighbors is precisely controlled in an alternating manner, and the defect of the interval KN between the center TPL of the array will produce a topological pattern.

However, the technical field of this document is quantum well resonators. It does not disclose conjugated photonic crystals or waveguide structures, and the article does not disclose the conditions for achieving conjugated photonic crystals or waveguide structures. Therefore, the previous topological quantum well micro column resonator still needs improvement.

Therefore, it would be a useful development to propose a robust conjugated-symmetric optical apparatus and a design method for a robust conjugate-symmetric optical apparatus, which can achieve a high quality factor and high performance at the same time, and without the function being affected by the environment or manufacturing defects.

In view of the shortcomings of the prior art, the applicant in this application, after careful experimentation and research, and with a spirit of perseverance, finally conceived this application and was able to overcome the shortcomings of the previous technology. The following is a brief description of the application.

SUMMARY OF THE INVENTION

In accordance with an aspect of the present invention, a robust conjugate symmetric optical apparatus is disclosed. The robust conjugate symmetric optical apparatus comprises a first optical cell set and a second optical cell set. The first optical cell set includes a first plurality of cells, each of which includes a first left half cell and a first right half cell, each of the first left half cells has a plurality of units, and the respective first right half cell and the corresponding first left half cell form a first symmetric structure. The second optical cell set includes a second plurality of cells, each of which includes a second left half cell and a second right half cell, and the respective second right half cell and the corresponding second left half cells form a second symmetric structure, wherein: each of the first left half cells of the first optical cell set and each of the second right half cells of the second optical cell set have the same structure; each of the first right half cells of the first optical cell set and each of the second left half cells of the second optical cell set have the same structure; the first optical cell set has a first light cutoff frequency band of a first reflection phase, and the second optical cell set has a second light cutoff frequency band of a second reflection phase; the first and the second light cutoff frequency bands are both continuous cutoff bands being partly overlapped under a first condition that the first and the second reflection phases are opposite; there is a second condition that a first low frequency band and a first high frequency band are adjacent to the first light cutoff frequency band, an optical digital transmission phase of the first low frequency band and that of the first high frequency band are opposite to each other, a second low frequency band and a second high frequency band are adjacent to the second light cutoff frequency band, an optical digital transmission phase of the second low frequency band and that of the second high frequency band are opposite to each other, the optical digital transmission phase of the first low frequency band and that of the second low frequency band are opposite to each other, and the optical digital transmission phase of the first high frequency band and that of the second high frequency band are opposite to each other; and the robust conjugate symmetric optical apparatus meets both the first and the second conditions.

In accordance with another aspect of the present invention, a robust conjugate symmetric optical apparatus is disclosed. The robust conjugate symmetric optical apparatus comprises a first optical cell set and a second optical cell set. The first optical cell set includes a first plurality of cells, each of which includes a first left half cell and a first right half cell, and the respective first right half cell and the corresponding first left half cells form a first symmetric structure therebetween. The second optical cell set includes a second plurality of cells, each of which includes a second left half cell and a second right half cell, and the respective second right half cell and the corresponding second left half cells form a second symmetric structure therebetween, wherein each of the first left half cells of the first optical cell set and each of the second right half cells of the second optical cell set have the same structure; and each of the first right half cells of the first optical cell set and each of the second left half cells of the second optical cell set have the same structure.

In accordance with a further aspect of the present invention, a robust conjugate symmetric optical apparatus is disclosed. The robust conjugate symmetric optical apparatus comprises a first optical cell set, an intermediate substance and a second optical cell set. The first optical cell set includes NL cells, wherein each of the NL cells having a first number includes a first left half cell and a first right half cell, and the first left half cell includes NA first units having a second number, and the first right half cell and the first left half cell are symmetric, where either of the first and the second numbers is greater than or equal to 2. The intermediate substance includes NM units having a third number greater than or equal to 0. The second optical cell set includes NR cells, wherein each of the NR cells having a fourth number includes a second left half cell and a second right half cell, and the second left half cell includes NB second units having a fifth number, and the second right half cell and the second left half cell are symmetric, where either of the fourth and fifth numbers is greater than or equal to 2, wherein: the first left half cell of the first optical cell set and the second right half cell of the second optical cell set have the same structure; and the first right half cell of the first optical cell set and the second left half cell of the second optical cell set have the same structure.

In accordance with another aspect of the present invention, the present disclosure provides a design method for a robust conjugate symmetric optical apparatus, comprising the following steps of: providing a first optical cell set, wherein the first optical cell set includes a first plurality of cells, each of the first plurality of cells includes a first left half cell and a first right half cell, each of the left half cells includes a plurality of units, and the respective first right half cell and the corresponding first left half cell form a first symmetric structure; providing a second optical cell set, wherein the second optical cell set includes a second plurality of cells, each of the second plurality of cells includes a second left half cell and a second right half cell, and the respective second right half cell and the corresponding second left half cell form a second symmetric structure; causing the same either the first left half cell of the first optical cell set and the second right half cell of the second optical cell set, or the first right half cell of the first optical cell set and the second left half cell of the second optical cell set, wherein the first optical cell set has a first light cutoff band of a first reflection phase, and the second optical cell set has a second light cutoff band of a second reflection phase; and obtaining at least one of a first and second conditions as follows: in the first condition, causing continuous either of the first light cutoff band and the second light cutoff band overlapping at least a part thereof, where the first reflection phase and the second reflection phase are opposite to each other; and in the second condition, causing mutually opposite any one phase pair of optical digital transmission phases of a first low frequency band and a first high frequency band adjacent to the first light cutoff frequency band, optical digital transmission phases of a second low frequency band and a second high frequency band adjacent to the second light cutoff frequency band, optical digital transmission phases of the first low frequency band and the second low frequency band, and optical digital transmission phases of the first high frequency band and the second high frequency band.

BRIEF DESCRIPTION OF THE DRAWINGS

The details and advantages of the present invention will become more readily apparent to those ordinarily skilled in the art after reviewing the following detailed descriptions and accompanying drawings.

FIG. 8A shows a schematic diagram of the electric field distribution of the first type optical apparatus Type1 in the 1st TES according to the preferred embodiment of the present disclosure.

FIG. 8B shows a schematic diagram of the electric field distribution of the second type optical apparatus Type 2 in the 1st CTES of the preferred embodiment of the disclosure.

FIGS. 18A to 18D show schematic diagrams of the absorptance and the chemical energy μc of the conductive film G according to a preferred embodiment of the present disclosure.

DETAILED DESCRIPTION OF THE PREFERRED EMBODIMENT

Please read the following detailed description with reference to the accompanying drawings of the present disclosure. The accompanying drawings of the present disclosure are used as examples to introduce various embodiments of the present disclosure and to understand how to implement the present disclosure. The embodiments of the present disclosure provide sufficient content for those skilled in the art to implement the embodiments of the present disclosure, or implement embodiments derived from the content of the present disclosure. It should be noted that these embodiments are not mutually exclusive with each other, and some embodiments can be appropriately combined with another one or more embodiments to form new embodiments, that is, the implementation of the present disclosure is not limited to the examples disclosed below. In addition, for the sake of brevity and clarity, relevant details are not excessively disclosed in each embodiment, and even if specific details are disclosed, only examples are used to make readers understand. The present invention will now be described more specifically with reference to the following embodiments. It is to be noted that the following descriptions of the preferred embodiments of this invention are presented herein for the purposes of illustration and description only; they are not intended to be exhaustive or to be limited to the precise form disclosed.

In addition to referring to the following drawings, FIGS. 3, 4A~4F, 5, 6, 7, 8A and 8B can also refer to drawings of the first citation, FIGS. 9A and 20A~20D can also refer to drawings of the third citation, FIGS. 14, 15A~15C, 16A~16D, 17A~17D and 18A~18D can also refer to drawings in the second citation, FIGS. 10A~10C, 11A~11B, 12A~12B and 13 can also refer to the unpublished paper conjugated topological interface-states in coupled ring resonators, by Y C Lin, B Y Chen and W J Hsueh (fourth citation).

Figure 1A:
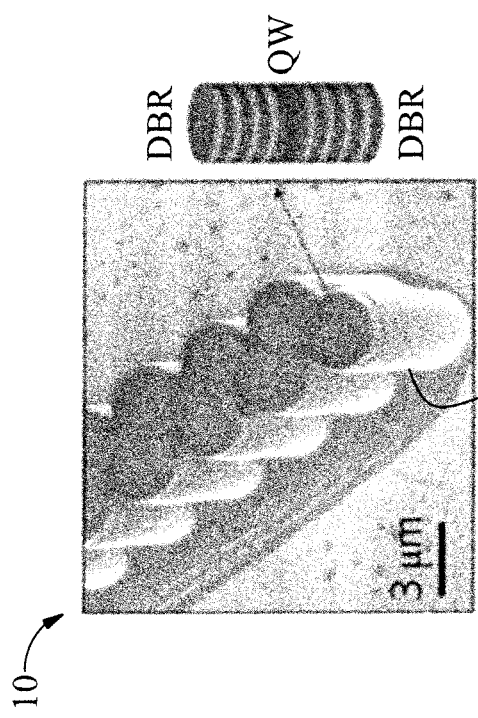
FIG. 1A shows active quantum well micro column resonator array in the prior art.
Figure 1B:
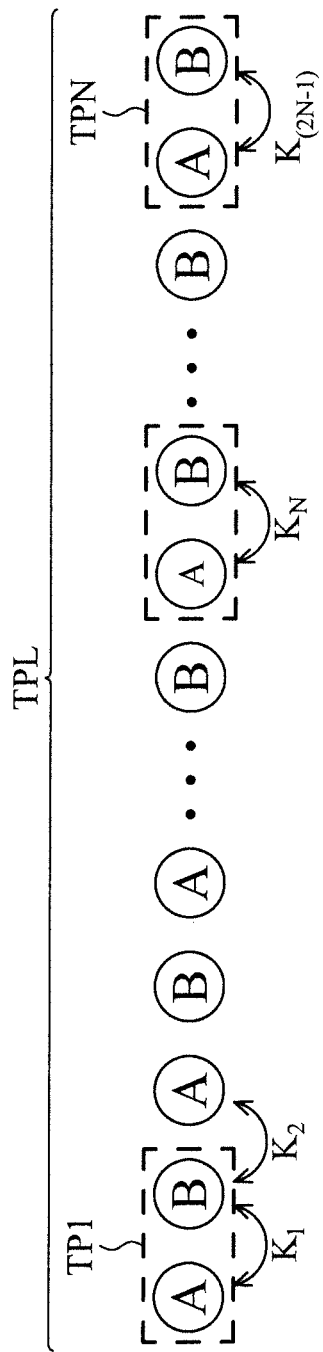
FIG. 1B shows active quantum well micro column resonator array in the prior art.
Figure 2:
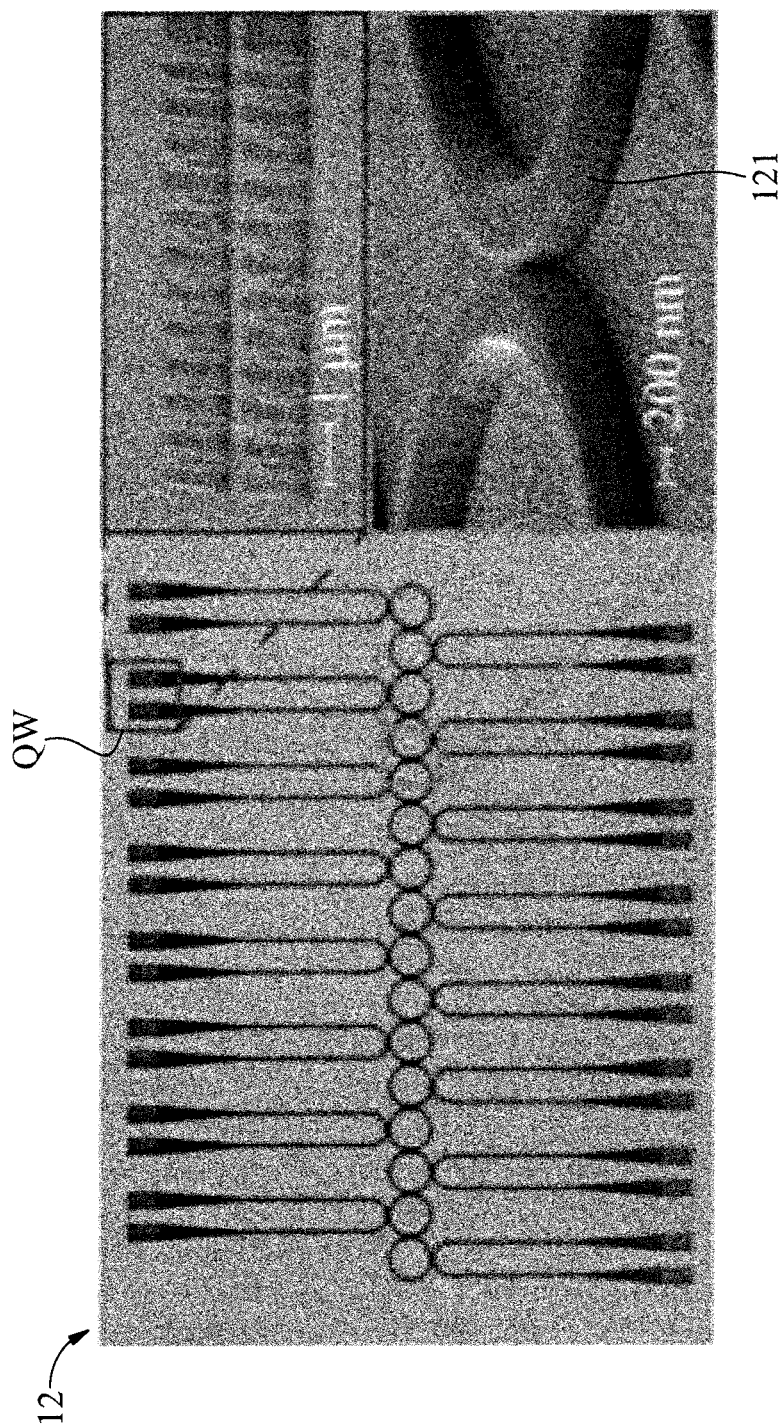
FIG. 2 shows micro ring array in the prior art.
Figure 3:
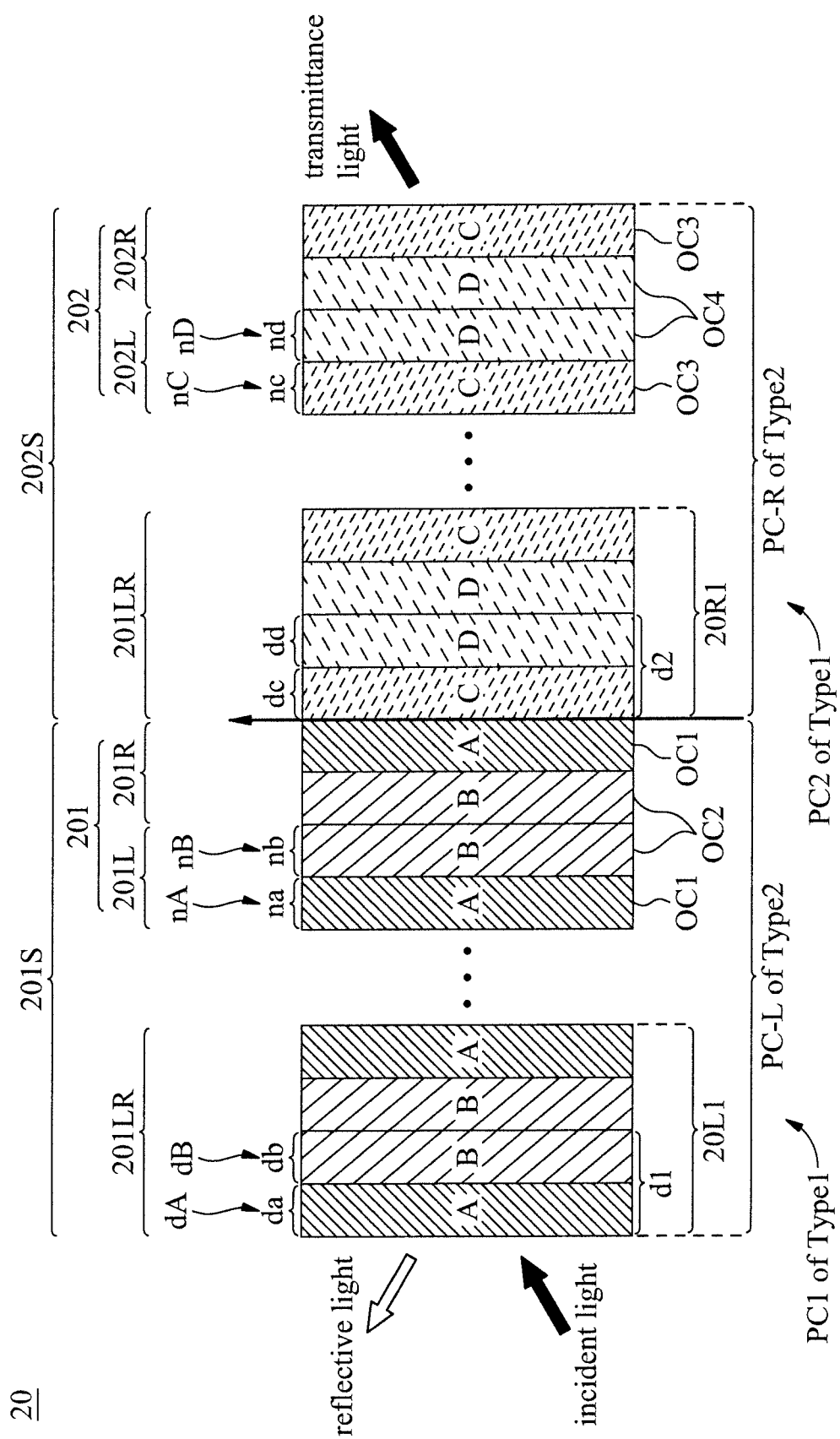
FIG. 3 shows a schematic diagram of a topological configuration of a robust conjugated-symmetric optical apparatus according to a preferred embodiment of the present disclosure.

Please refer to FIG. 3, which is a schematic diagram of a topological configuration of a robust conjugated-symmetric optical apparatus 20 according to a preferred embodiment of the present disclosure. The specific form is implemented in a layered form, but is not limited to a layered form. The robust conjugated-symmetric optical apparatus 20 includes a first optical cell set PC-L and a second optical cell set PC-R. Please refer to FIGS. 4A~4B, which are schematic diagrams of the frequency band structure of the two optical cell sets PC1 and PC2 of the optical apparatus of another preferred embodiment, both two optical cell sets PC1 and PC2 are combined to be called the first type optical apparatus Type1, it is non-robust optical apparatus that is not conjugated-symmetric. The horizontal axis represents the normalized Bloch phase of light in the first and second two optical cell sets PC1, PC2, and Bloch phase is the digital transmittance phase of light in the passband, called Zak phase, which is a digitized phase, either 0 or π, as shown in FIGS. 4A~4F, and will be explained later. In the range of the light cutoff band FGA, the first pattern part is used to represent that the reflection phase of the light cutoff band (Frequency Gap) is positive. In the range of the light cutoff band FGB, the second pattern part is used to represent the reflection phase of the light cutoff band is negative. The topological configuration of the two optical cells PC1, PC2 is similar to the topological configuration of the first optical cell set PC-L and the second optical cell set PC-R, but has different measurement parameters and optical parameters. Optical crystals with specific measurement parameters and optical parameters can form a robust conjugated-symmetric optical apparatus.

Figures 4A, 4B, 4C:
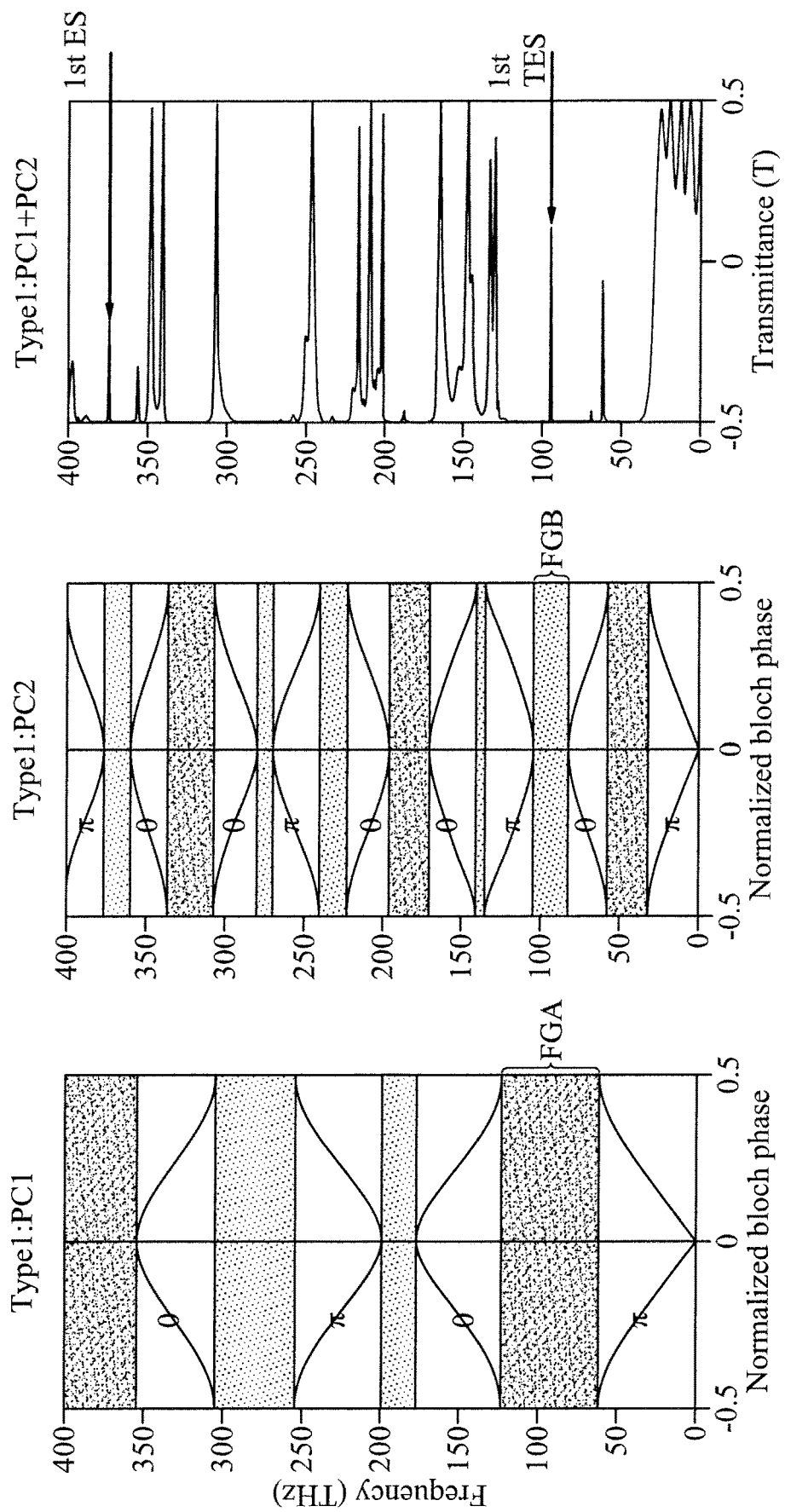
FIGS. 4A and 4B show schematic diagrams of the frequency band structure of the two optical cell sets.
FIG. 4C shows a schematic diagram of the transmittance spectrum of the interface between the two optical cell sets of the Type 1 optical apparatus according to the preferred embodiment of the present disclosure.

Please refer to FIG. 4C, which is a schematic diagram of the transmittance spectrum of the interface between the two optical cell sets PC1 and PC2 of the Type 1 optical apparatus according to the preferred embodiment of the present disclosure. The horizontal axis represents the transmittance T of the interface between the two optical cell sets PC1 and PC2, and the vertical axis represents the frequency of light. In FIG. 4C, it can be seen that the interface between the two optical cell sets PC1 and PC2 only has edge state ES or topological edge state TES, but there is no Conjugated Topological Edge State CTES. The narrow pulses which are close to frequencies of 375 THz and 100 THz show that it has high Q values, and edge states ES or topological edge states TES exist respectively. Although the first type optical apparatus Type1 has a high quality factor (high Q), the transmittance T is approximately 0.65 and 0.35, respectively, which still fail to achieve a transmittance close to 100%. In FIG. 4C, it can be seen that the edge state ES or the topological edge state TES appears in the overlapping frequency range between a first optical cut-off band FGA of the first optical cell set PC1 and a second optical cut-off band FGB of the second optical cell set PC2.

Figures 4D, 4E, 4F:
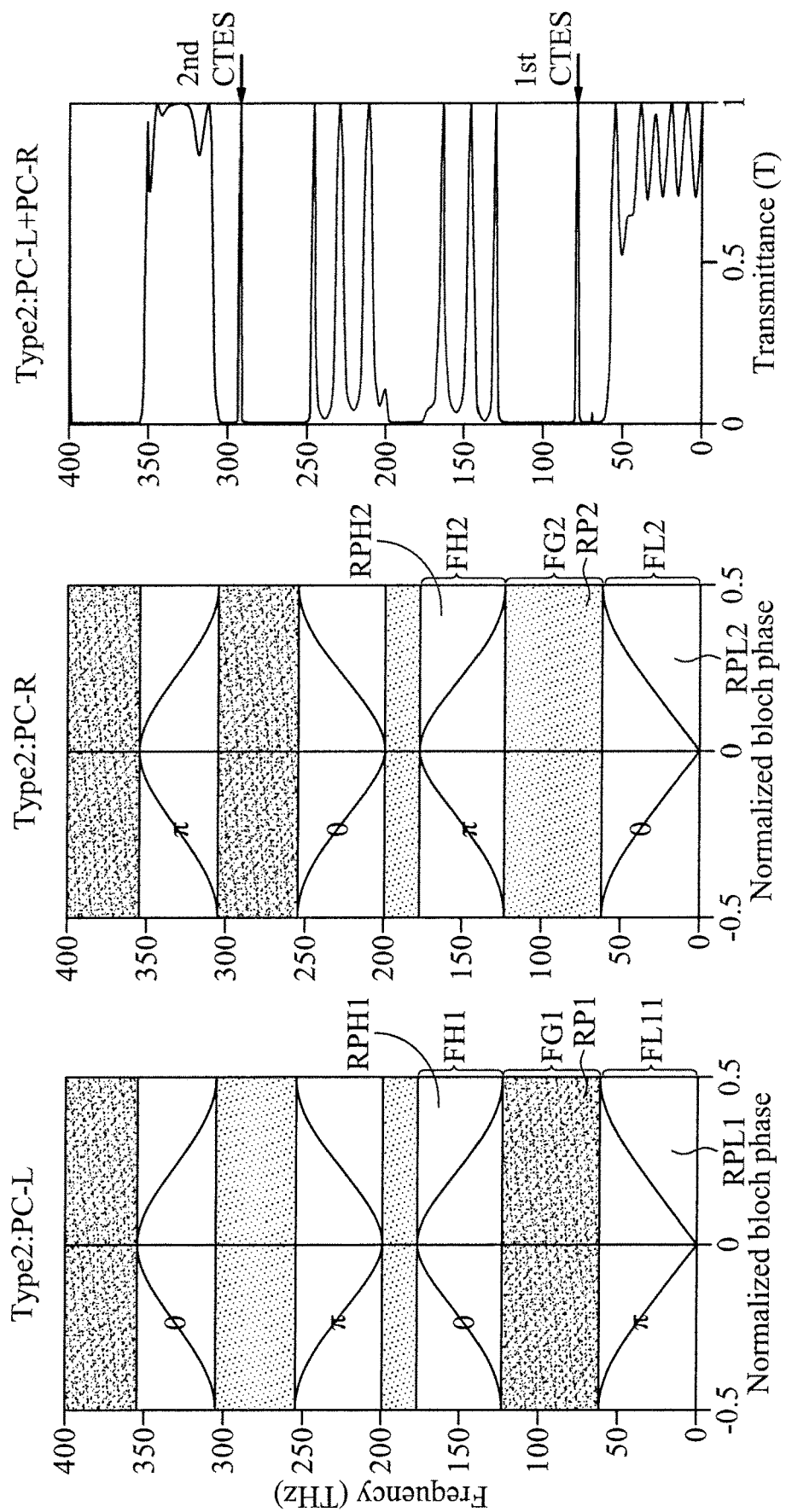
FIGS. 4D~4E shows schematic diagrams of the frequency band structure of the two optical cell sets PC-L and PC-R of the Type 2 robust conjugated-symmetric optical apparatus 20 according to the preferred embodiment of the present disclosure.
FIG. 4F shows a schematic diagram of the transmittance spectrum of the interface between the two optical cell sets according to a preferred embodiment of the present disclosure.

Please refer to FIGS. 4D~4E, which are schematic diagrams of the frequency band structure of the two optical cell sets PC-L and PC-R of the Type 2 robust conjugated-symmetric optical apparatus 20 according to the preferred embodiment of the present disclosure, which are called the second type optical apparatus Type2. The horizontal axis represents the normalized Bloch phase of light in the first and second two optical cell sets PC-L and PC-R. In the range of the light cut-off band FG1, the first pattern part is used to represent that the reflection phase of the light cut-off band as positive. In the range of the light cutoff band FG2, the second pattern part is used to represent that the reflection phase of the light cutoff band is negative. Please refer to FIG. 4A, which is a schematic diagram of the transmittance spectrum of the interface between the two optical cell sets PC-L and PC-R according to a preferred embodiment of the present disclosure. The horizontal axis represents the transmittance T of the interface between the two optical cell sets PC-L and PC-R, and the vertical axis represents the frequency of light.

Please refer to FIG. 4F, which is a schematic diagram of the transmittance spectrum of the interface between the two optical cell sets PC-L and PC-R according to a preferred embodiment of the present disclosure. The horizontal axis represents the transmittance T of the interface between the two optical cell sets PC-L and PC-R, and the vertical axis represents the frequency of light. It can be seen from FIG. 4F, there are only conjugated topological edge states CTES at the interface between the two optical cell sets PCL and PC-R, and it can be known from the narrow pulses that both have high Q value near the frequency of 75 THz and 290 THz. The second-type optical apparatus Type2 exhibiting conjugate symmetry has both high quality factor (high Q) and a transmittance close to 100%.

Please refer to FIGS. 3, 4D~4F together, the robust conjugated-symmetric optical apparatus 20 includes the first and second optical cell sets PC-L and PC-R. The first optical cell set PC-L includes a first plurality of cells 201S, each of the first plurality of cells 201 includes a first left half cell 201L and a first right half cell 201R, the respective first left half cell 201L and the corresponding first right half cell 201R form a first symmetric structure 201LR. The first optical cell set PC-L is used to form a first light cutoff frequency band FG1 having a first reflection phase RP1. The second optical cell set PC-R includes a second plurality of cells 202S, each of the second plurality of cells 202 includes a second left half cell 202L and a second right half cell 202R, the second left half, and the respective left half cell 202L and the corresponding second right half cell 202R form a second symmetrical structure 202LR, wherein: each of the first left half cells 201L of the first optical cell set PC-L and each of the second right half cell 202R of the second optical cell set PC-R have the same structure; each of the first right half cells 201R of the first optical cell set PC-L and each of the second left half cell 202L of the second optical cell set PC-R have the same structure. The second optical cell set PC-R is used to form a second light cutoff frequency band FG2 having a second reflection phase RP2. The first light cut-off band FG1 and the second light cut-off band FG2 are both continuous cut-off bands and at least a part of the two overlap under a first condition that the first reflection phase RP1 and the second reflection phase RP2 are opposite to each other. There is a second condition that a first low frequency band FL1 and a first high frequency band FH1 are adjacent to the first light cutoff frequency band FG1, an optical digital transmission phase RPL1 of the first low frequency band FL1 and that RPL2 of the first high frequency band FH1 are opposite to each other, a second low frequency band FL2 and a second high frequency band FH2 are adjacent to the second light cutoff frequency band FG2, an optical digital transmission phase RPL2 of the second low frequency band FL2 and that RPH2 of the second high frequency band FH2 are opposite to each other, the optical digital transmission phase RPL1 of the first low frequency band FL1 and that RPL2 of the second low frequency band FL2 are opposite to each other, and the optical digital transmission phase RPH1 of the first high frequency band FH1 and that RPH2 of the second high frequency band FH2 are opposite to each other. The robust conjugate symmetric optical apparatus 20 meets both the first and the second conditions.

In a preferred embodiment, please refer to FIGS. 3, 4D-4F, the first left half cell 201L includes a first unit layer A and a first unit layer B to form a continuous first left half cell synthetic layer AB; the first right half cell 201R includes a first unit layer B and a first unit layer A to form a continuous first right half cell synthetic layer BA; the second left half cell 202L includes a second unit layer C and a second unit layer D to form a continuous second left half cell synthetic layer CD. Because the first left half cell 201L is equal to the second right half cell 202R, and the first right half cell 201R is equal to the second left half cell 202L, the second left half cell continuous synthetic layer CD is equal to the continuous first right half cell synthetic layer BA, and the second right half cell continuous synthetic layer DC is equal to the first left half cell continuous synthetic layer AB.

The description of Zak phase and reflection phase is as follows:

$$\gamma_n = \oint_C A_n(R) \cdot dR \quad (1)$$

In the Equation (1), $$A_n(R) = i\left\langle n(R) \left| \frac{\partial}{\partial R} \right| n(R) \right\rangle$$

is Berry Connection, C is expressed as a closed loop in the parameter space R, usually expressed as a two-dimensional or three-dimensional Bloch momentum space, after the state of the system evolves adiabatically along the closed loop reaching the original state, a phase is accumulated. The phrase is also called (geometric phase).

Under the one-dimensional photonic crystal system, its Zak phase is shown in formula (2)

$$\theta_n^{zak} = \int_{-\frac{\pi}{A}}^{\frac{\pi}{A}} \left[ i \int_{unit\ cell} \varepsilon(z) u_{n,k}^*(z) \partial_K u_{n,k}(z) dZ \right] dK \quad (2)$$

In formula (2), $\varepsilon(z)$ is the dielectric function in space, and $u_{n,k}(z)$ is the characteristic electric field function of the Bloch wave vector K on the n-th passband, $i\int_{unit\ cell}\varepsilon(z)u_{n,k}^*(z)\partial_K u_{n,k}(z)\,dZ$, which is the Berry connection. If only one independent passband is discussed, it will inevitably have two band edge states, and the Zack phase of the passband is directly related to the symmetry of the band edge states, such as the two band-edge states on the independent passband have the same symmetry, and their Zack phase is 0; if two band-edge states on independent passbands do not have the same symmetry, their Zack phase is π.

Reflection phase: In the photonic crystal energy band structure, the reflection phase of the forbidden band is directly related to the imaginary part $$\text{Im}\left(\frac{Z_s}{Z_0}\right)$$

of the surface impedance, and its corresponding relationship with the Zack phase of the pass band is equations (3) and (4)

$$e^{i\theta_n^{zak}} = -\frac{\text{sgn}\left[\text{Im}\left(\frac{Z_s}{Z_0}\right)_{n+1}\right]}{\text{sgn}\left[\text{Im}\left(\frac{Z_s}{Z_0}\right)_n\right]}, n = 1, 2, 3, \ldots \quad (3)$$

$$e^{i\theta_n^{zak}} = -\frac{\text{sgn}[(\phi_R)_{n+1}]}{\text{sgn}[(\phi_R)_n]}, n = 1, 2, 3, \ldots \quad (4)$$

Where $\theta_n^{zak}$ is the Zack phase of the nth passband, $$\text{Im}\left(\frac{Z_s}{Z_0}\right)_{n+1}, \text{Im}\left(\frac{Z_s}{Z_0}\right)_n$$

is the surface impedance of the n+1th and nth forbidden band divided by the imaginary part of the air impedance; $(\phi_R)_{n+1}'(\phi_R)_n$ is the reflection phase of the n+1th and nth forbidden band.

The 0th passband cannot be calculated by (3) or (4), it must be calculated by the definition of the 0th Zack phase in Reference [4], as in equation (5)

$$e^{i\theta_0^{zak}} = \text{sgn}\left[1 - \frac{\varepsilon_1\mu_2}{\varepsilon_2\mu_1}\right] \quad (5)$$

於 $n=\sqrt{\varepsilon\mu}$, When $\mu1=\mu2=1$, (5) can be regarded as equation (6)

$$e^{i\theta_0^{zak}} = \text{sgn}\left[1 - \frac{n_1}{n_2}\right] = \text{sgn}[n_2 - n_1] \quad (6)$$

Because $e^{i\theta_0^{zak}}=\cos\theta_0^{zak}$, we can know from equation (6)
(i) When n1<n2, $e^{i\theta_0^{zak}}=1$, so $\theta_0^{zak}=0$
(ii) When n1>n2, $e^{i\theta_0^{zak}}=-1$, so $\theta_0^{zak}=\pi$ In any embodiment of the present disclosure, such as in FIG. 3, each of the first plurality of optical units OC1 is a first optical unit layer A, and each of the second plurality of optical units OC2 is a second optical unit layer B, each of the third plurality of optical units OC3 is a third optical unit layer C, and each of the fourth plurality of optical units OC4 is a fourth optical unit layer D. The first optical unit layers A and the second optical unit layers B are configured to form a first continuous layer 20L1 and conform to a first topology ABBA. The third optical unit layers C and the fourth optical unit layers D are configured to form a second continuous layer 20R1 and conform to a second topological configuration CDDC. The first, second, third, and fourth optical parameters nA, nB, nC, and nD are the refractive indices na, nb, nc, nd of each optical unit layer. The first metric parameter dA is a first thickness da of the first optical unit layer A, the second metric parameter dB is a second thickness db of the second optical unit layer B, and the third metric parameter dC is a third thickness dc of the third optical unit layer C, and the fourth metric parameter dD is a fourth thickness dd of the fourth optical unit layer D. At least a part of the first topology configuration ABBA is arranged periodically in ABBA based on the first and second metric parameters dA, dB, and at least a part of the second topology configuration CDDC based on the third and fourth metric parameters dC, dD is arranged periodically in CDDC. The first factor is F1, and F1=da/(da+db). The second factor is F2, and F2=dc/(dc+dd).

For example, the first type optical apparatus Type1, $ni=no=1$ represents the refractive index $ni=1$ of the medium before the incident light of the first type optical apparatus Type1 enters the first optical cell set PC1. The refractive index of the output medium from the second optical cell set PC2 is $no=1$, and $nA=3$, $nB=1$, $nC=3$, $nD=1$, $d1=1$ um, $d2=1.85$ um, $F1=0.3$, $F2=0.38$, then $F1+F2=0.68$, which is not equal to 1, nA is not equal to nD, and nB is not equal to nC, so the first optical apparatus Type1 has not yet reached the state of conjugate symmetry. Therefore, the interface between the first optical cell set PC1 and the second optical cell set PC2 only has edge state ES or topological edge state TES, but there is no conjugate topological edge state CTES, as shown in FIGS. 4A~4C.

As another example for comparison, the second type optical apparatus Type2, $ni=no=1$ represents the refractive index $ni=1$ of the medium before the incident light of the second type optical apparatus Type2 enters the first optical cell set PC-L, the refractive index of the exit medium completely emerging from the second optical cell set PC-R is $no=1$, and $nA=3$, $nB=1$, $nC=1$, $nD=3$, $d1=1$ um, $d2=1$ um, $F1=0.3$, $F2=0.7$, then $F1+F2=1$, nA is equal to nD, and nB is equal to nC, so the second optical apparatus Type2 reaches the state of conjugate symmetry. Therefore, the interface between the first optical cell set PC-L and the second optical cell set PC-R has conjugate topology edge state CTES, and the optical apparatus having conjugate topology edge state CTES will have high Q value, robustness, and is nearly complete 100% transmittance of the light transmittance as shown in FIGS. 4D~4F.

Figure 5:
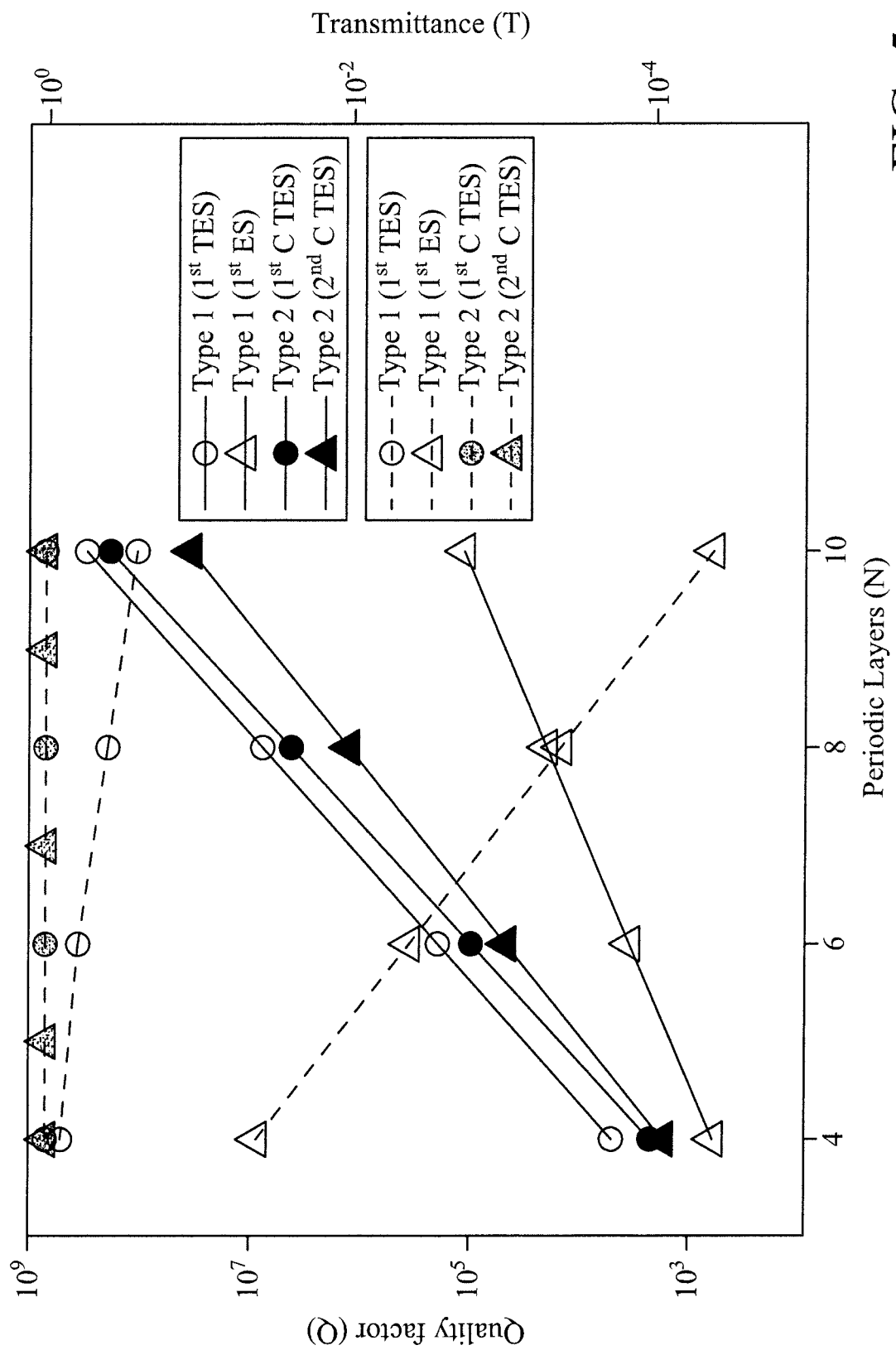
FIG. 5 shows a schematic diagram of the quality factor and the transmittance of the optical cell set of different topologies upon different period layers N according to a preferred embodiment of the present disclosure.

Please refer to FIG. 5, which is a schematic diagram of the quality factor and the transmittance of the optical cell set of different topologies upon different period layers N according to a preferred embodiment of the present disclosure. The horizontal axis represents the number of layers of the topological configuration that the optical cell set periodically repeats, the left vertical axis represents the quality factor Q, and the right vertical axis represents the transmittance T. The quality factors of various optical cell sets are represented by solid lines, and the transmittance of various optical cell sets are represented by dashed lines. The solid hollow circle, the solid hollow triangle, the solid circle, and the solid triangle respectively represent the quality factor of the first topological edge state 1st TES of the first optical apparatus Type1 in FIG. 3C, the quality factor of the first edge state 1st ES of the first optical apparatus Type1 in FIG. 3C, the quality factor of the first conjugate topology edge state 1st CTES of the second optical apparatus Type2 in FIG. 3F, and the quality factor of the second conjugate topological edge state 2nd CTES of the second optical apparatus Type2 in FIG. 3F. The dotted hollow circle, the dotted hollow triangle, the dotted pattern circle, and the dotted pattern triangle respectively represent the transmittance of the first topological edge state 1st TES of the first optical cell set optical apparatus Type1 in FIG. 3C, the transmittance of the first edge state 1st ES of the first optical apparatus Type1 in FIG. 3C, the transmittance of the first conjugate topology edge state 1st CTES of the second optical apparatus Type2 in FIG. 3F, and the transmittance of the second conjugate topology edge state 2nd CTES of the second optical apparatus Type2 in FIG. 3F. It can be seen that whether it is the first optical apparatus Type1 or the second optical apparatus Type2, the Q value of both will increase as the number of layers of the periodically repeated topology increases. However, in the transmittance aspect, the second optical apparatus Type2 having conjugate topology edge state CTES, as the number of periodic layers N increases, its transmittance of the 1st CTES and 2nd CTES interfaces as shown in FIG. 4F are close to 100% light transmittance, which means that the conjugate symmetry and the aforementioned conditions can achieve high Q value and high transmittance and excellent effect of maintaining robustness.

Figure 6:
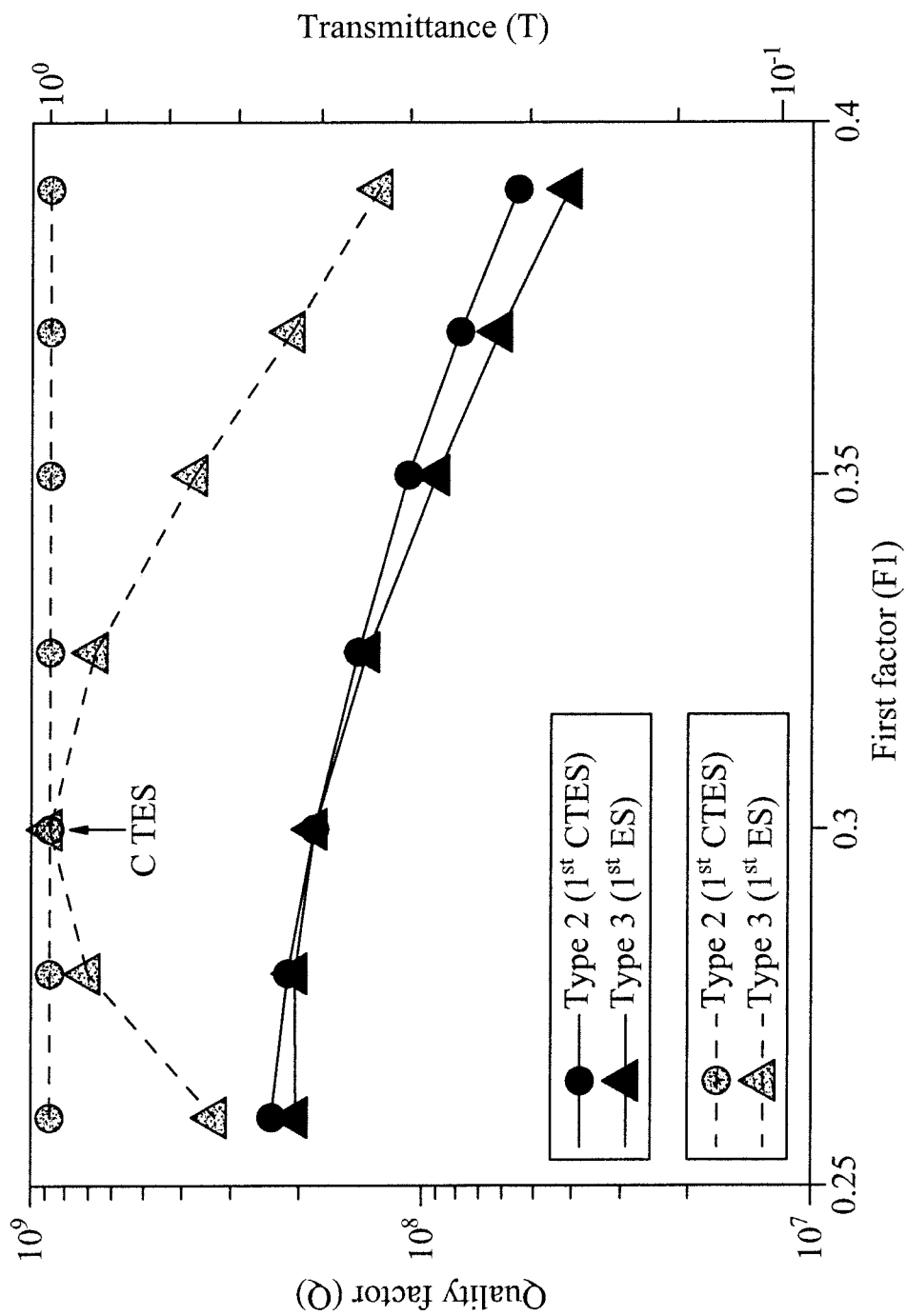
FIG. 6 shows a schematic diagram of quality factor and transmittance changes upon the first and the second factor according to a preferred embodiment of the present disclosure.
Figure 7:
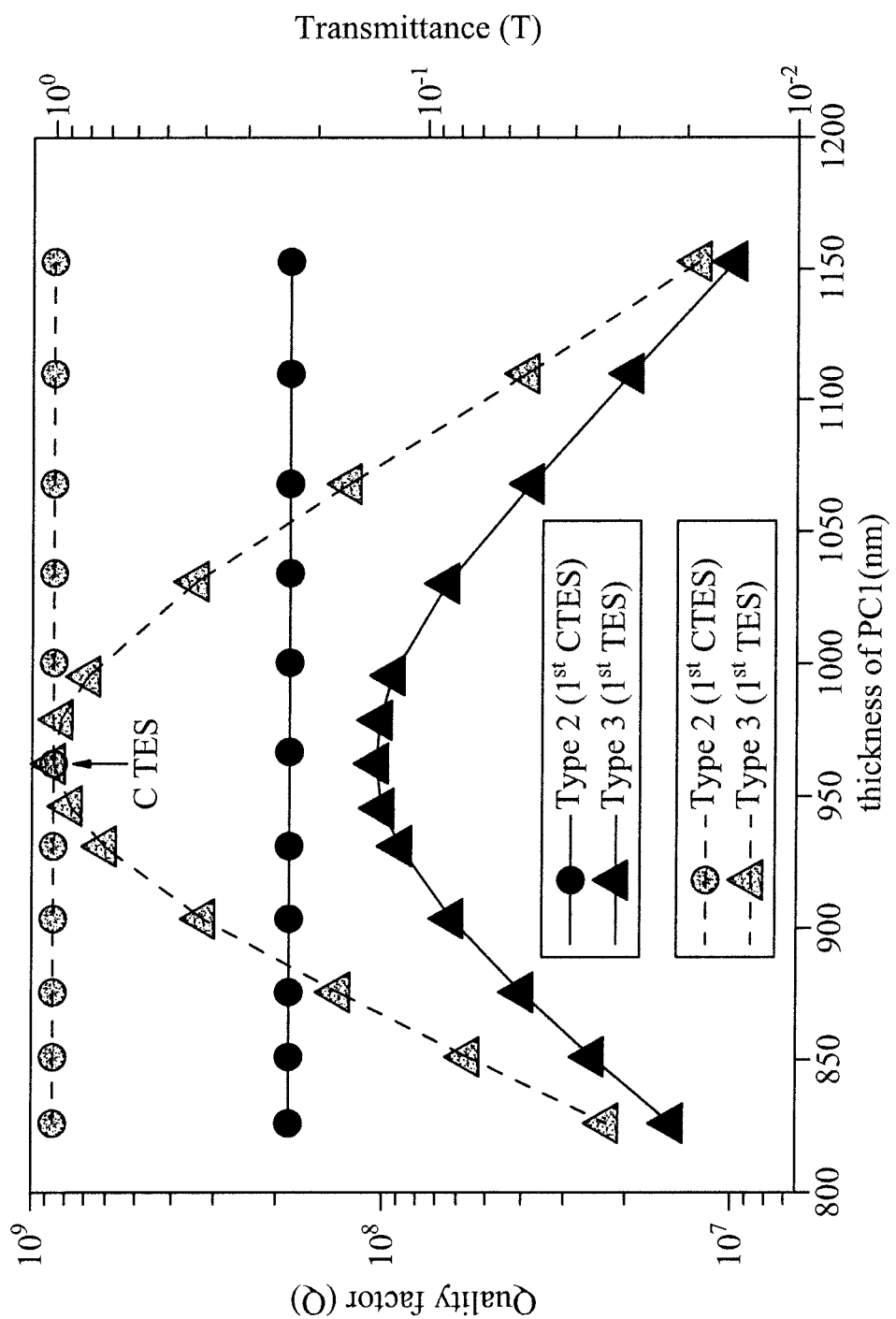
FIG. 7 shows a schematic diagram of comparing the quality factor and the transmittance changes upon the thickness according to a preferred embodiment of the present disclosure.

Please refer to FIG. 6, which is a schematic diagram of quality factor and transmittance changes upon the first and the second factor F1, F2 changes, showing comparisons of robust conjugate symmetric and non-robust optical apparatus according to a preferred embodiment of the present disclosure. The horizontal axis represents the change of the first factor F1, the left vertical axis represents the quality factor Q, and the right vertical axis represents the transmittance T. In the design, the optical apparatus has a conjugate symmetric structure by changing the measurement parameters or optical parameters of the optical apparatus, and by calculating whether the first factor and the second factor meet a standard (for example, the sum of the two is one specific value), which can be used to assist in the design of optical apparatus having conjugate symmetry. Here, the second type optical apparatus Type2 is compared with a third type optical apparatus Type3. The curve formed by the solid line and the solid circle represents the curve of the quality factor of the second type of optical apparatus Type2 that has a conjugate symmetry state as the first factor F1 increases, and the curve formed by the solid line and solid triangle represents curve changes, which shows that the first curve of the quality factor of the non-conjugate optical apparatus Type3 changes upon the increase of the first factor F1. The curve formed by the dotted pattern circle represents that the transmittance of the second-type optical apparatus Type2 changes upon the increase of the first factor F1, wherein the second-type optical apparatus Type2 has reached the conjugate symmetry state. The curve formed by the dotted-line pattern triangle represents the curve that the transmittance of the non-conjugate optical apparatus Type3 changes upon the increase of the first factor F1.

Accordingly, the measurement parameters and optical parameters of the second type optical apparatus Type2 are the same as described above, they are $d1=1$ um, $d2=1$ um, $ni=no=1$, $nA=3$, $nB=1$, $nC=1$, $nD=3$ respectively, both the first and second factors are variable, and the sum of F1 and F2 is fixed at 1, i.e., the first left half cell 201L of the first optical cell set PC-L and the second right half cell 202R of the second optical cell set PC-R is the same (having the same structure); the first right half cell 201R of the first optical cell set PC-L and the second left half cell 202L of the second optical cell set PC-R is the same, and the two optical cell sets PC-L and PC-R are conjugated and symmetric. It can be seen from FIG. 6 that although the Q value changes (decreases) with the increase of the first factor F1, it still remains close to complete transmittance, showing that an optical crystal with conjugate characteristics can maintain transmittance close to 100% regardless of the change in the Q value, and maintain good robustness.

The optical parameters of the third optical apparatus Type3 are $ni=no=1$, $nA=3$, $nB=1$, $nC=3$, $nD=1$, the first factor F1 can be changed, but the second factor F2 is fixed at $F2=0.7$., When the first left half cell 201L of the first optical cell set PC1 is different from the second right half cell 202R of the second optical cell set PC2, and the first right half cell 201R of the first optical cell set PC1 is different from the second left half cell 202L of the second optical cell set PC2, causing the first factor F1 changes and $F1+F2\neq1$, it can be seen from FIG. 6, the Q value changes (decreases) with the increase of the first factor F1, and the transmittance T close to full penetration cannot be maintained. It is only when the first left half cell 201L of the first optical cell set PC1 is the same as the second right half cell 202R of the second optical cell set PC2, and the first right half cell 201R of the first optical cell set PC1 is the same as the second left half cell 202L of the second optical cell set PC2, causing the first factor F1=0.3, the second factor F2=0.7, and F1+F2=1, the third optical apparatus Type3 will have a transmittance T close to full penetration. Under this condition, the third type optical apparatus Type3 has the characteristic of conjugate symmetry, just like the second type optical apparatus Type2.

In any embodiment of the present disclosure, the variation of the thickness of the optical unit layer does not substantially affect the light transmittance at the interface for an optical cell set having conjugate symmetry, and does not affect the quality factor. The Q value of the optical cell set of non-conjugate symmetry will be affected when the thickness of the optical unit layer changes. Please refer to FIG. 7, which is a schematic diagram of comparing the quality factor and the transmittance changes of the conjugate symmetric optical apparatus and the non-robust conjugate symmetric optical apparatus as the thickness changes according to a preferred embodiment of the present disclosure. Applying the second type optical apparatus Type2 and the third type optical apparatus Type3 in FIG. 6 as an example, both use the same first optical cell set PC1, and the horizontal axis represents the thickness of the first optical cell set PC1. F1=0.3, F2=0.7 for the second type optical apparatus Type2 that has a conjugate symmetry state, F1=0.35, F2=0.7 for the third type optical apparatus Type3 that does not have a conjugate symmetry state. It can be seen from FIG. 7, when the thickness changes, the quality factor of the second-type optical apparatus Type2 having a conjugate symmetry state remains constant, and the transmittance also remains constant at almost 100%. However, the quality factor of the third type optical apparatus Type3 that does not have a conjugate symmetry state is not only poor and cannot be maintained constantly, but also the transmittance cannot be maintained constantly. Only when the thickness is about 962.6 nm can almost 100% transmittance be achieved. Therefore, it can be seen that when the process flaw (or deficiency) affects the thickness or optical parameters of the robust conjugate symmetric optical apparatus, even if the quality factor changes, the transmittance is still not affected by the process flaw.

Please refer to FIG. 8A, which is a schematic diagram of the electric field distribution of the first type optical apparatus Type 1 in the 1st TES according to the preferred embodiment of the present disclosure. Please refer to FIG. 8B, which is a schematic diagram of the electric field distribution of the second type optical apparatus Type 2 in the 1st CTES of the preferred embodiment of the disclosure. The horizontal axis represents the thickness of each optical unit layer on the x-axis, and the vertical axis represents the square value of the electric field intensity on the x-axis. Due to the excitation of the topological structure, the light is strongly positioned in the edge state of the interface between the two photon cell sets. The electric field distribution of the first CTES resonance mode in the second type optical apparatus Type2 is relatively high, and the square value of the maximum electric field intensity is $8 \times 10^7$, which is larger than that of the first type optical apparatus Type1. The edge state ES exists on the interface between the two optical cell sets PC1 and PC2. This is different from the traditional Fabry-Perot based on photonic crystal resonator and micro cavity of Bragg mirror. The optical apparatus disclosed in this disclosure is also different from the quantum well. TES and CTES of topological optics have been shown to produce robust edge conductance and topological protection instead of standing waves. The electric field distribution of TES and CTES is asymmetrical, which is also different from the traditional Fabry-Perot resonator. The basic principle of maintaining complete transmittance in high-Q systems is that the structure of conjugate symmetric optical apparatus can significantly enhance the resonance or positioning state of the CTES interface. The reason for the enhanced resonance or positioning state is that when the light from the left side arrives in the photonic structure, a part of it is reflected back to the structure. This reflection is equivalent to enhancing the boundary reflection coefficient of the multilayer. If constructive interference occurs, it means that the two beams are in phase, resulting in an increase in optical resonance inside the resonator. Therefore, the stronger the interface mode resonance enhances the positioning state and transmittance. In addition, these CTES resonances can use topological photonic crystal modes to enhance optical-matter interactions and nonlinear optical devices and improve optical transmittance performance.

The robust conjugated symmetric optical apparatus 20 not only exists in layered optical apparatus, but also exists in other shapes or forms of optical apparatus, such as ring-shaped optical apparatus. Please refer to FIG. 9A, which is a schematic diagram of the topology of the robust conjugate symmetric optical apparatus 30 according to a preferred embodiment of the disclosure. In any embodiment of the present disclosure, the robust conjugate symmetric optical apparatus 30 includes a first optical cell set SCRR-L and a second optical cell set SCRR-R. The first optical cell set SCRR-L includes a first plurality of cells 301S, each of the first plurality of cells 301 includes a first left half cell 301L and a first right half cell 301R, the first left half cell 301L includes a first unit right half ring a' and a left half ring b to form a first left half cell adjacent (or continuous) two half rings a'b; the first right half cell 301R includes a first unit right half ring b' and the left half ring a to form a first right half cell adjacent two half ring b'a. The two adjacent half rings a'b of the first left half cell and the two adjacent half rings b'a of the first right half cell form the adjacent half ring a'bb'a of the first cell, namely 30L1. The second optical cell set SCRR-R includes a second plurality of cells 302S, each of the second plurality of cells 302 includes a second left half cell 302L and a second right half cell 302R, the second left half cell 302L includes a second unit right half ring c' and a left half ring d to form a second left half cell adjacent (or continuous) half ring c'd; the second right half cell 302R includes a second unit right half ring d' and the left half ring c to form a second right half cell adjacent two half rings d'c. The two consecutive half rings c'd of the second left half cell and the two consecutive half rings d'c of the second right half cell form the adjacent (or continuous) half c'dd'c of the second cell, namely 30R1.

In any embodiment of the present disclosure, due to the structure of the robust conjugate symmetric optical apparatus 30, the first left half cell 301L and the first right half cell 301R are mirror-symmetrical, the second left half cell 302L and the second right half cell 302R is mirror-symmetrical, the first left half cell 301L is equivalent to the second right half cell 302R, and the first right half cell 301R is equivalent to the second left half cell 302L, so the second left half cell 302L is equivalent to a second unit right half ring b' and left half ring a to form a second left half cell adjacent (or continuous) half ring b'a. The second right half cell 3032R includes a second unit right half ring a' and the left half ring b to form a second right half cell adjacent two half rings a'b.

The two consecutive half rings b'a of the second left half cell and the two consecutive half rings a'b of the second right half cell form the adjacent (or continuous half) b'aa'b of the second cell.

In any embodiment of the present disclosure, the first left half ring a and the first right half ring a', the second left half ring b and the second right half ring b' are configured to form a first cell continuous ring 30L1 and conforms to a first topology a'bb'a. The third left half ring c and the third right half ring c', and the fourth left half ring d and the fourth right half ring d' are arranged to form a second cell set adjacent ring 30R1, and conform to a second topology configuration c'dd'd. The total path length of the left half ring a and the right half ring a' of the first optical cell is ra, the total path length of the left half ring b and the right half ring b' of the second optical cell is rb, the total path length of the left half ring c and the right half ring c' of the third optical cell is rc, and the total path length of the left half ring d and the right half ring d' of the fourth optical cell is rd. At least a part of the first topology configuration is based on the first and second metric parameters dA, dB to present in a periodic arrangement of a'bb'a, and at least a part of the second topology configuration is based on the third and fourth metric parameters dC and dD to present in a periodical arrangement of c'dd'c. The first factor is expressed as FSRL=ra/(ra+rb), and the second factor is expressed as FSRR=rc/(rc+rd).

Figure 9A:
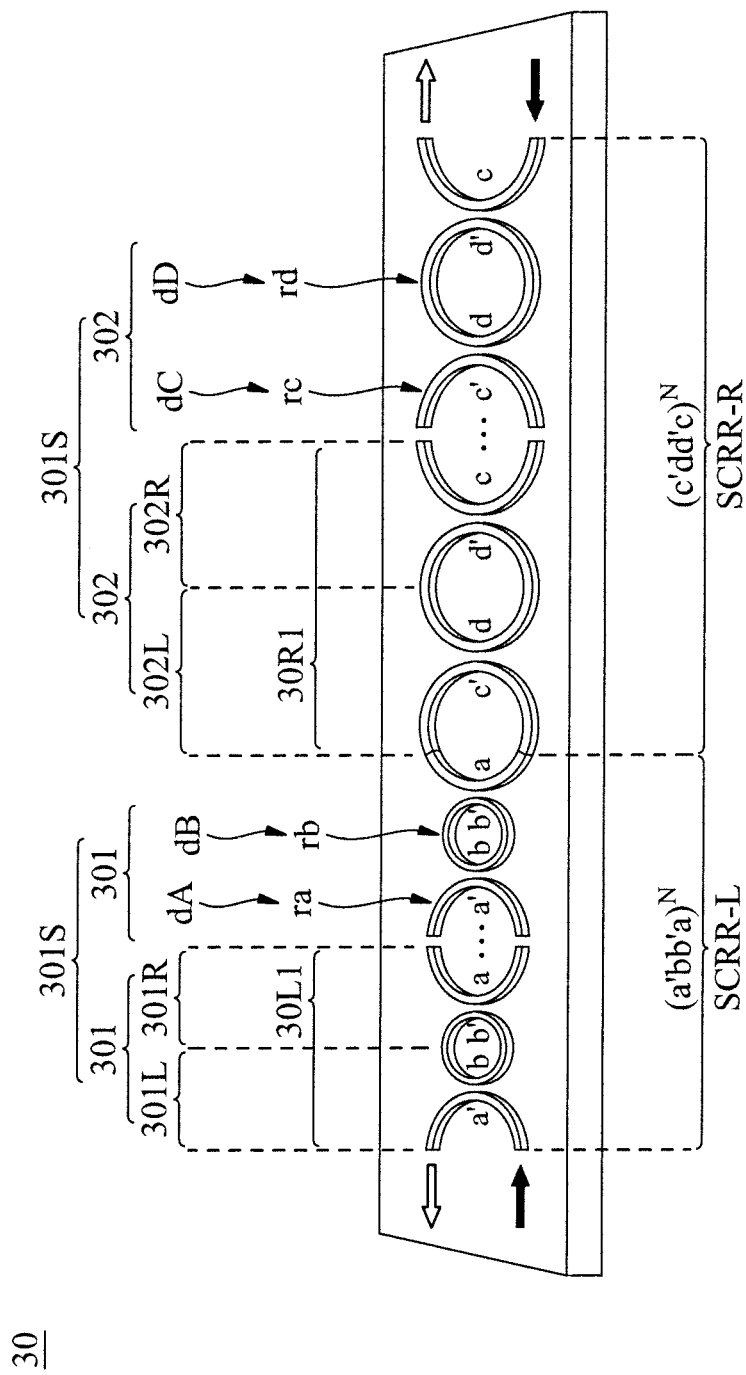
FIG. 9A shows a schematic diagram of the topology of the robust conjugate symmetric optical apparatus according to a preferred embodiment of the disclosure.
Figure 9C:
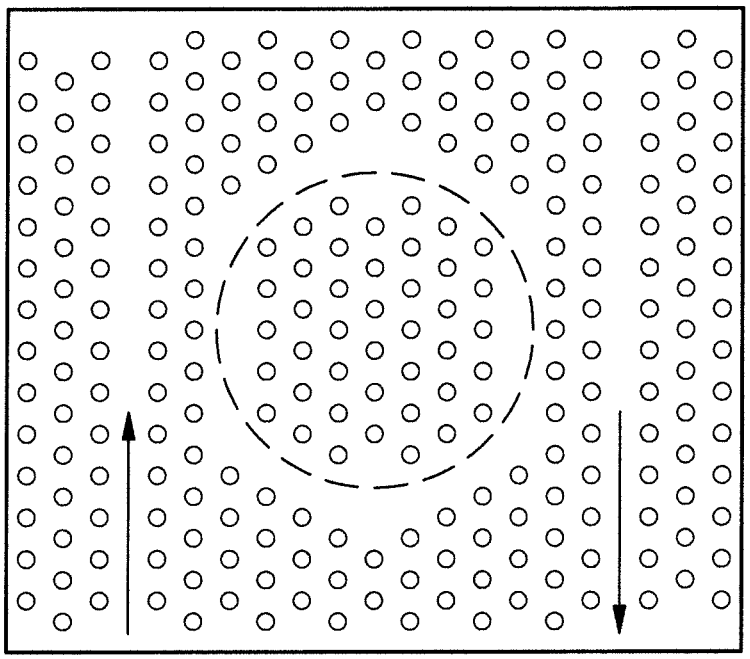
FIG. 9C shows a schematic diagram of a single crystal ring according to the preferred embodiment of the present disclosure.
Figure 9B:
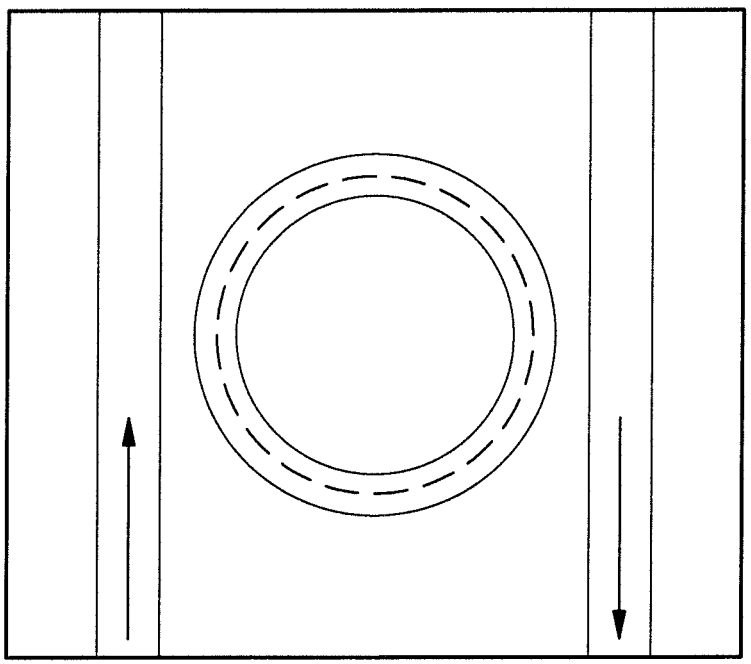
FIG. 9B shows a schematic diagram of a single waveguide ring according to a preferred embodiment of the present disclosure.

In any embodiment of the present disclosure, the ring-shaped optical apparatus may include, for example, a waveguide ring 32, a two-dimensional crystal ring 34, etc., as shown in Figs. B and C. FIG. 9B is a schematic diagram of a single waveguide ring 32 according to a preferred embodiment of the present disclosure, and FIG. 9C is a schematic diagram of a single crystal ring 34 according to the preferred embodiment of the present disclosure. Both the waveguide ring 32 or the crystal ring 34 can be continued to form a one-dimensional optical structure.

In any embodiment of the present disclosure, the half-ring structure includes at least one of a linear structure and a curved structure. On the condition that both the path lengths of the half-ring structure and the other half-ring structure are equal, the two half-ring structures are regarded equivalent. In other words, the two ring structures are not judged by the same shape but by the path length, which can be extended to judge whether the optical unit or the optical cell is symmetrical. For example, the right half ring of the first unit is a C shape having a path length of RR, the left half ring of the first unit is a mirror image of a C shape having a path length of RL, the right half ring of the second unit is a C shape having a path length of RR, and the left half ring of the second unit is in a shape of Arabic numerals having a path length of RL. Accordingly, not only the two half rings of the first optical cell has a symmetric structure, but also the two half rings of the second optical cell has a symmetrical structure.

In any embodiment of the present disclosure, each of the first, second, third, and fourth optical units OC1, OC2, OC3, OC4 is a dielectric material, a conductor, or a semiconductor, and the robustness conjugate symmetric optical apparatus 20, 30 has multiple optical structures and has a transmittance, wherein the transmittance T is not affected by defects generated in the manufacturing process of each of the multiple optical crystal structures, and is maintained at a relative high transmittance.

Figures 10A, 10B, 10C:
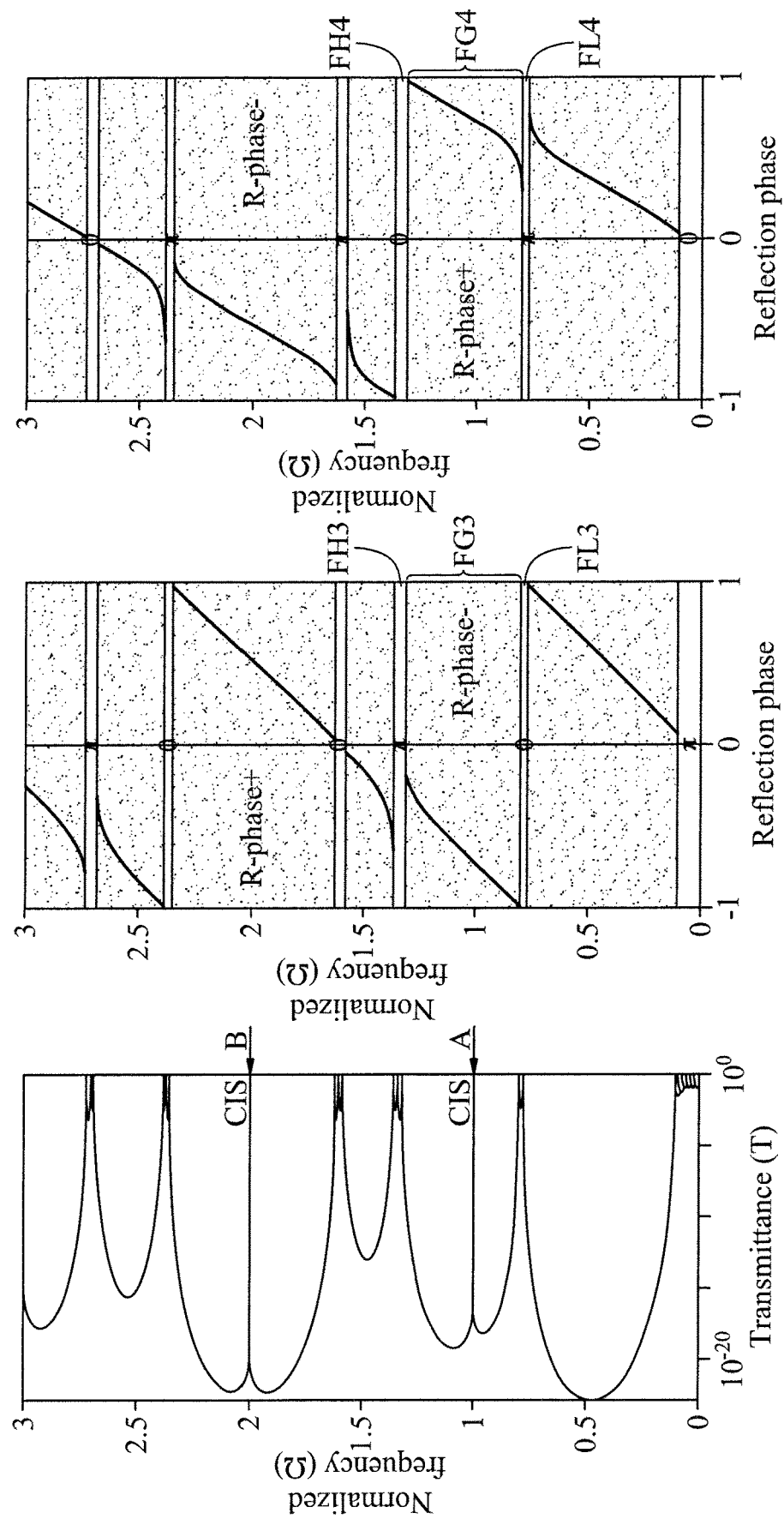
FIG. 10A shows a schematic diagram of the transmittance spectrum of the first and the second optical cell set according to a preferred embodiment of the present disclosure.
FIG. 10B shows a schematic diagram of the reflection phase of the first optical cell set according to a preferred embodiment of the present disclosure.
FIG. 10C shows a schematic diagram of the reflection phase of the second optical cell set according to a preferred embodiment of the present disclosure.

Please refer to FIG. 10A, which is a schematic diagram of the transmittance spectrum of the first optical cell set SCRR-L and the second optical cell set SCRR-R of a preferred embodiment of the present disclosure. The horizontal axis represents the transmittance T, the vertical axis represents the normalized light frequency expressed in Q. Please refer to FIG. 10B, which is a schematic diagram of the reflection phase of the first optical cell set SCRR-L according to a preferred embodiment of the present disclosure. The horizontal axis represents the reflection phase, the patterned part represents the cut-off band, and the blank and unpatterned part represents the passband. The 0 and π bands on the passband represent the optical digital transmission phase (Zake phase), and the vertical axis represents the normalized optical frequency expressed in Ω. Please refer to FIG. 10C, which is a schematic diagram of the reflection phase of the second optical cell set SCRR-R according to a preferred embodiment of the present disclosure. The horizontal axis and the vertical axis represent the same meaning as FIG. 10B. In FIGS. 10B and 10C, R-phase+ represents the reflection phase is positive, and R-phase− represents the reflection phase is negative.

The ring-shaped optical cell set is similar to the layered optical cell set. The interface between the two optical cell sets has a topological interface-state (TIS), which is equivalent to the layered topology. Edge state TES, in particular, can have a conjugate topology interface state (Conjugated TIS, CTIS) or conjugate interface state CIS, which is equivalent to layered conjugate topology edge state CTES.

Similarly, in the design of a ring-shaped optical cell set, by changing the measurement parameters or optical parameters of the optical unit, the optical apparatus can have a conjugate symmetric structure, and by calculating whether the first factor and the second factor meet a standard (For example, the sum of the two is a specific value), which can be used to assist in the design of optical apparatus having conjugate symmetry.

For example, the robust conjugate symmetric optical apparatus 30 has a first factor FSRL=0.37, a second factor FSRR=0.63, ra+rb=50 um, and a total of N continuous rings 30L1 in the first optical cell set, N=4. The same coupling coefficient between rings a'b or b'a is represented by Cab, and Cab=0.1. Similarly, the first optical cell set SCRR-L and the second optical cell set SCRR-R respectively have a first light cut-off band FG3 and a second light cut-off band FG4, wherein at least a part of the first light cut-off band FG3 of the frequency range overlaps with the second light cut-off band FG4, and the first light cut-off band FG3 and the second light cut-off band FG4 respectively have a first reflection phase R-phase- and a second reflection phase R-phase+. Other conditions for forming a conjugate topology interface state at the interface between the first optical cell set SCRR-L and the second optical cell set SCRR-R are as follows: the first reflection phase R-phase- and the second reflection phase R-phase is opposite to each other, a first low frequency band FL3 adjacent to the first light cutoff frequency band FG3 (such as the phase of 0 in FIG. 10B) and a first high frequency band FH3 (such as the transmission phase of the optical digital bits in FIG. 10B (the phase is π) is opposite to each other, and a second low frequency band FL4 adjacent to the second optical cut-off frequency band FG4 (for example, the phase in FIG. 10C is π) and the optical digital transmission phases of a second high frequency band FH4 (for example, the phase of C in the tenth figure is 0) are opposite to each other, the optical digital transmission phases of the first low frequency band FL3 and the second low frequency band FL4 are opposite to each other, and the optical digital transmission phases of the first high-frequency band FH3 and the second high-frequency band FH4 are opposite to each other, so that the interface between the first optical cell set SCRR-L and the second optical cell set SCRR-R forms a conjugate topology interface state CTIS, and the CTIS appears in the range where the first light cutoff band FG3 and the second light cutoff band FG4 overlap in the frequency range. In the design aspect, the sum FSRL+FSRR=1 of the first factor FSRL=0.37 and the second factor FSRR=0.63 can be calculated firstly to design a ring-shaped optical apparatus having conjugate symmetry.

Figures 11A, 11B:
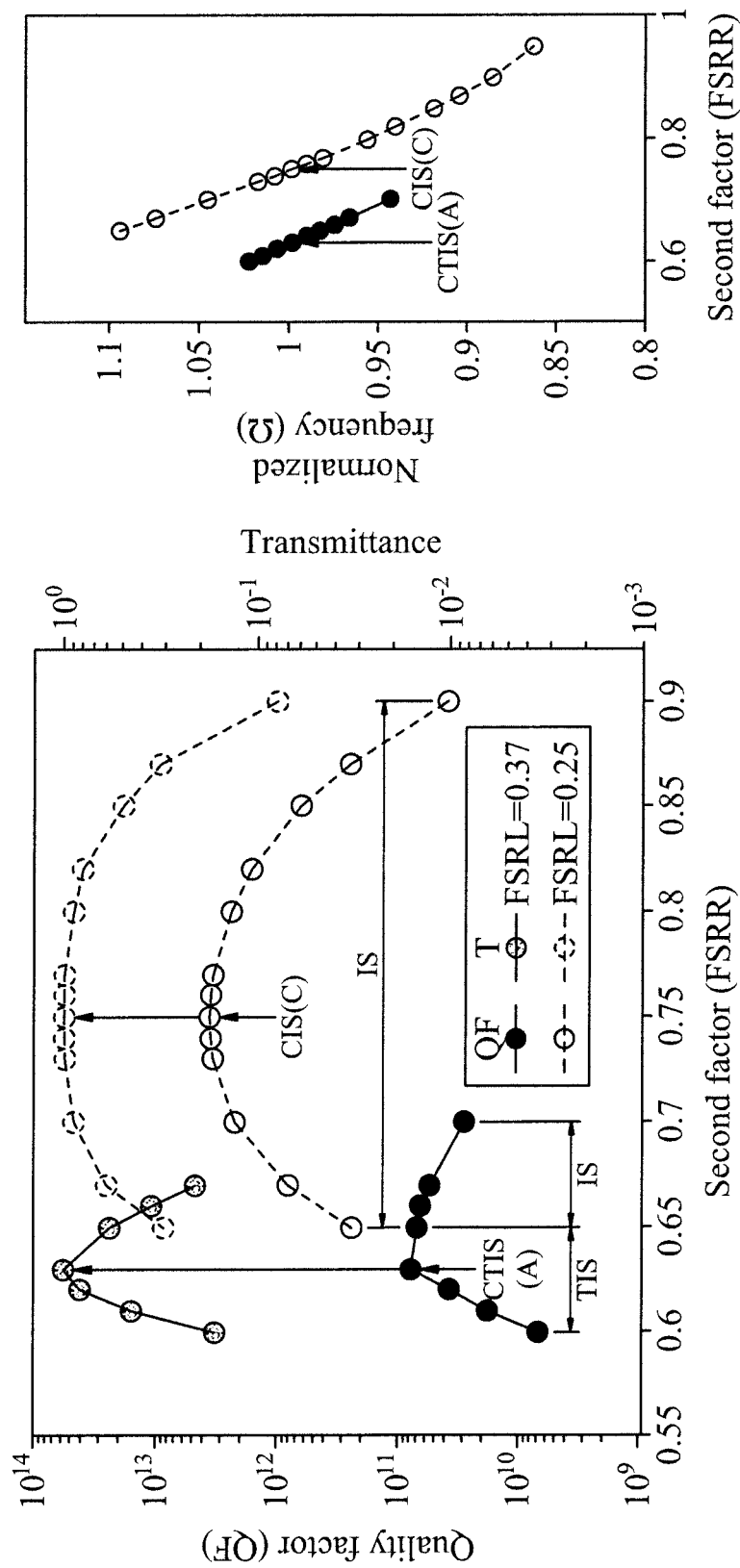
FIG. 11A shows a schematic diagram of the quality factor and transmittance of the second optical cell set as a function of the second factor according to a preferred embodiment of the present disclosure.
FIG. 11B shows a schematic diagram of the normalized frequency of the second optical cell set relative to the second factor change according to a preferred embodiment of the present disclosure.

Please refer to FIG. 11A, which is a schematic diagram of the quality factor Q and transmittance T of the second optical cell set SCRR-R as a function of the second factor FSRR according to a preferred embodiment of the present disclosure. The horizontal axis represents the second factor. FSRR, the left vertical axis represents the quality factor Q, and the right vertical axis represents the transmittance T. Please refer to FIG. 11B, which is a schematic diagram of the normalized frequency of the second optical cell set SCRR-R relative to the second factor FSRR change according to a preferred embodiment of the present disclosure. In Figs. A and B, the solid line connected by the solid circle represents a curve, wherein the first factor FSRL=0.37 is fixed, and the quality factor QF changes upon the second factor FSRR. The solid line connected by the pattern circle represents the change curve of the transmittance T upon the change of the second factor FSRR at the fixed first factor FSRL=0.37; and the dotted line connected by the hollow solid line circle represents a curve, wherein the first factor FSRL=0.25 is fixed, and the transmittance T changes upon the second factor FSRR. Please refer to FIGS. 10A, 11A, and 11B, on the condition of normalized frequency $\Omega$=1, for a fixed first factor FSRL=0.37, there is a conjugate topology interface state CTIS, which appears FSRR=0.63, which can reach the highest quality factor QF and transmittance T under this condition. On the other hand, under the condition of normalized frequency $\Omega$=1, for the fixed first factor FSRL=0.25, there is a conjugated interface state CIS, which appears under the condition of FSRR=0.75, can reach the highest quality factor QF and transmittance T. Therefore, it can be seen that the optical crystal having conjugated topology interface state CTIS or conjugated interface state CIS has better quality factor QF and transmittance T.

Figure 12A:
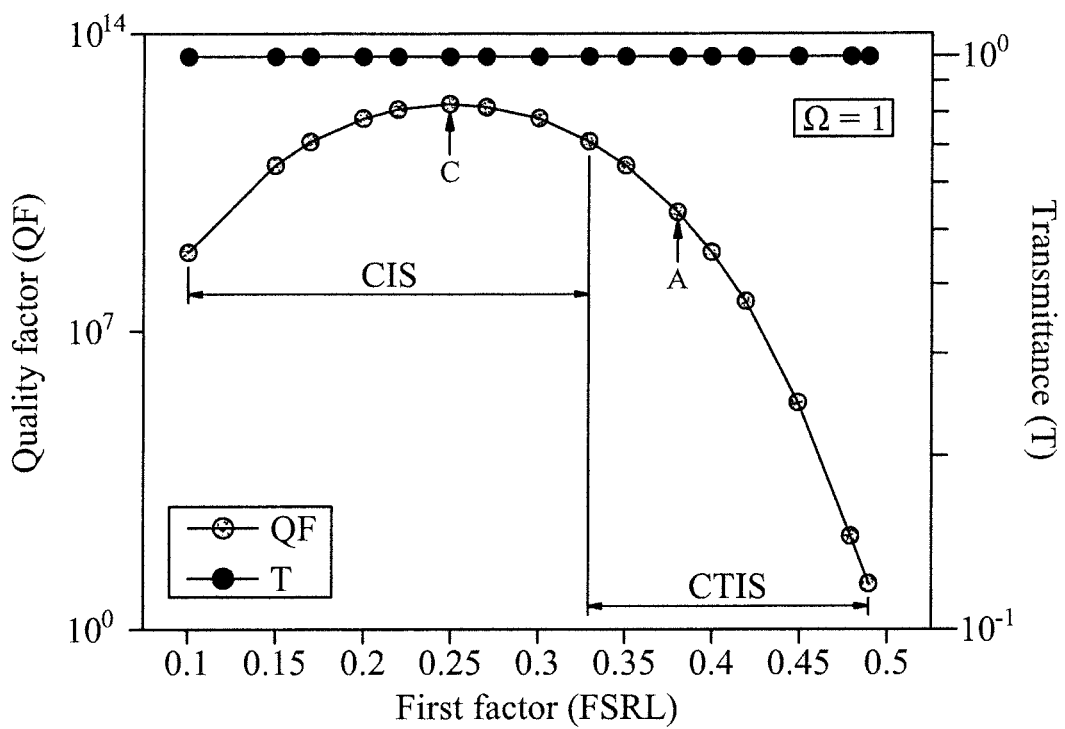
FIG. 12A shows a schematic diagram of the variation of the quality factor and the transmittance at a first frequency upon the first factor according to a preferred embodiment of the present disclosure.

Please refer to FIG. 12A, which is a schematic diagram showing the variation of the quality factor QF and the transmittance T at a first frequency of the robust conjugate symmetric optical apparatus 30 upon the variation of the first factor FSRL according to a preferred embodiment of the present disclosure. Taking the example of its conjugate symmetry state, the sum of the first factor FSRL and the second factor FSRR is always 1. The horizontal axis represents the first factor FSRL, the left vertical axis represents the quality factor QF, the right vertical axis represents the transmittance T, and the solid line formed by the pattern circle represents a curve, wherein the quality factor QF of the optical crystal 30 changes upon the first factor FSRL. The solid line formed by the solid circles represents the change curve of the transmittance T of the optical crystal 30 upon the change of the first factor FSRL. On the condition that normalized frequency $\Omega$=1, no matter how the quality factor QF changes, the transmittance remains at nearly 100%, and the best quality factor QF appears at point C of the conjugate interface state CIS instead of the conjugate topology point A of the interface state, which is slightly different from the layered robust conjugated symmetric optical element. However, no matter how the quality factor QF changes, the transmittance can be maintained, and it has almost complete transmittance and robustness.

Figure 12B:
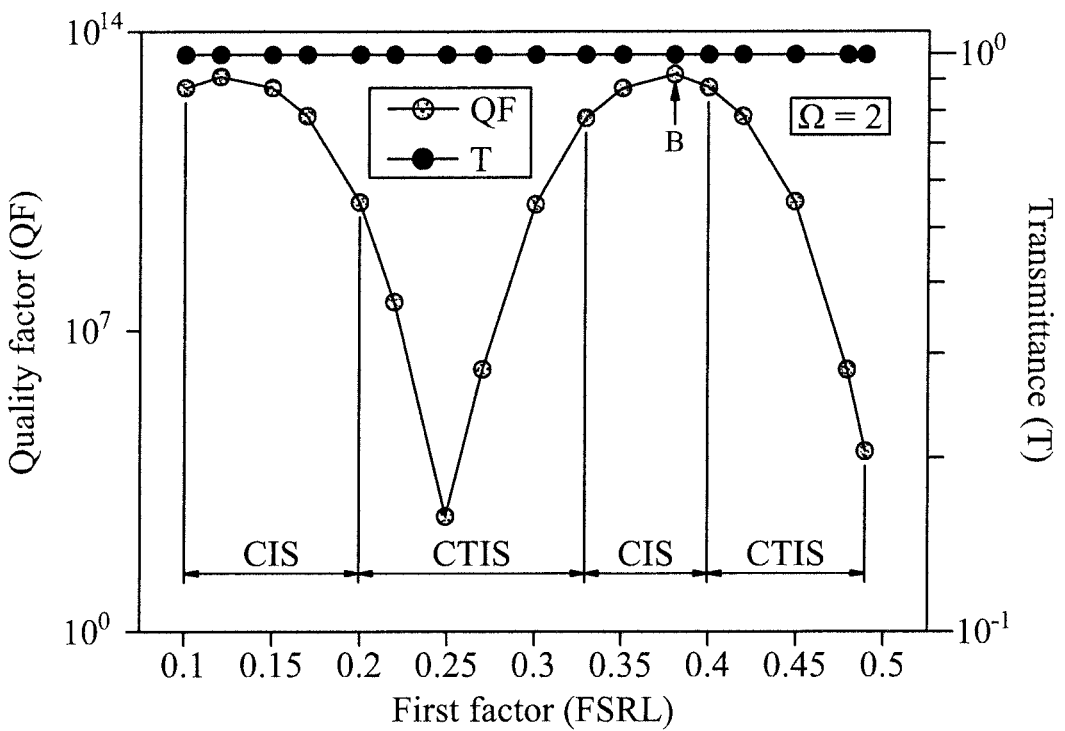
FIG. 12B shows a schematic diagram of the variation of the quality factor and the transmittance of the robust conjugate symmetric optical apparatus having the variation of the first factor at a second frequency according to a preferred embodiment of the present disclosure.

Please refer to FIG. 12B, which is a schematic diagram of the variation of the quality factor QF and the transmittance T of the robust conjugate symmetric optical apparatus 30 having the variation of the first factor FSRL at a second frequency according to a preferred embodiment of the present disclosure. Taking the example of its conjugate symmetry state to illustrate, the sum of the first factor FSRL and the second factor FSRR is always 1. The horizontal axis represents the first factor FSRL, the left vertical axis represents the quality factor QF, and the right vertical axis represents the transmittance T. The solid line formed by the pattern circle represents a curve, wherein the quality factor QF of the optical crystal 30 changes upon the first factor FSRL. The solid line formed by the solid circles represents the change curve of the transmittance T of the optical crystal 30 upon the change of the first factor FSRL. Under the condition of normalized frequency $\Omega$=2, no matter how the quality factor QF changes, the transmittance T remains at nearly 100%. The best quality factor QF appears at point B of the conjugate interface state CIS, rather than at the conjugate topological interface state, which is slightly different from that of the layered robust conjugate symmetric optical apparatus. However, it is for sure that no matter how the quality factor QF changes, the transmittance T can be maintained, i.e., it has almost complete transmittance and robustness simultaneously.

Figure 13:
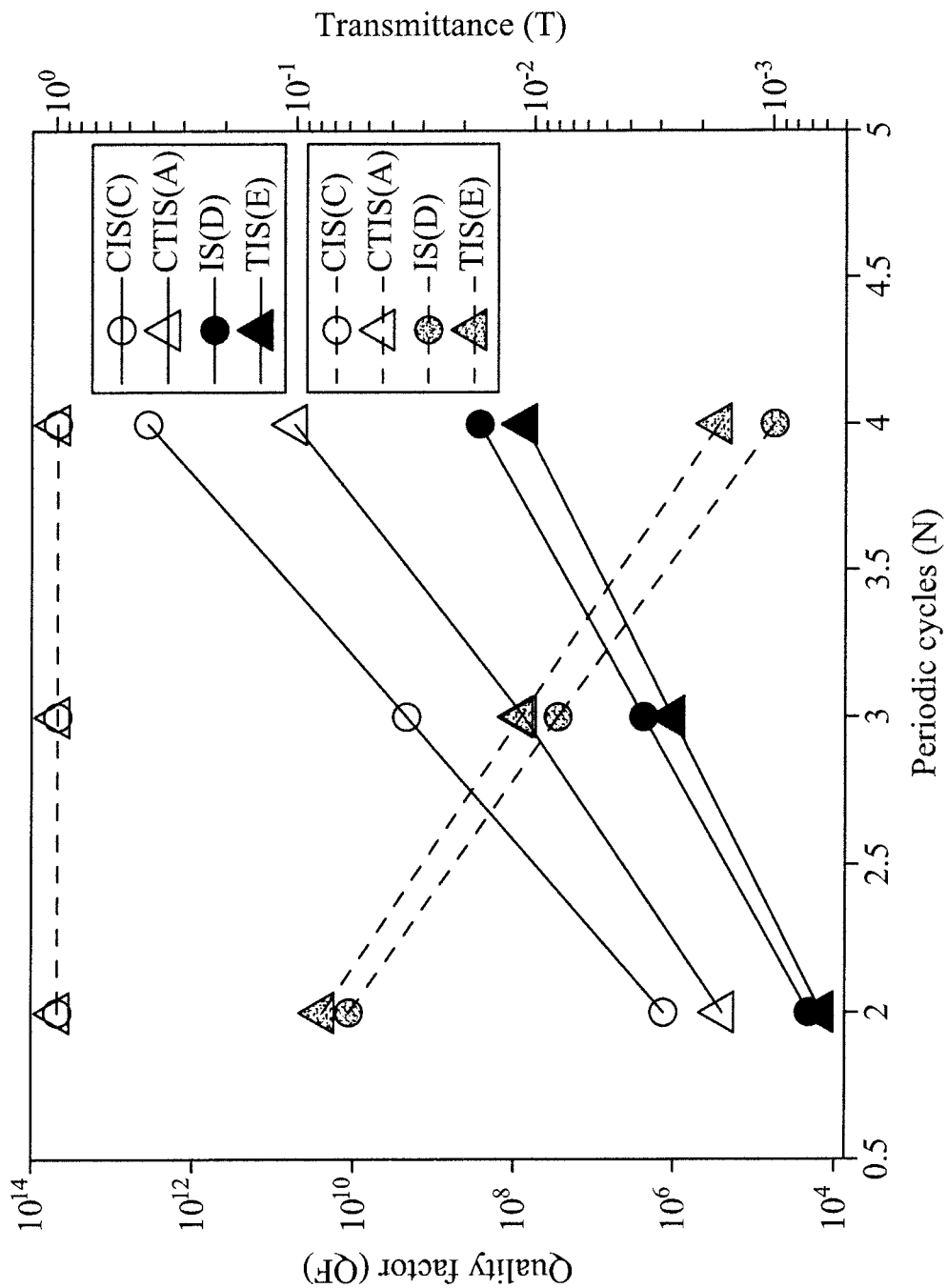
FIG. 13 shows a schematic diagram of the quality factor and the transmittance with respect to the number of periodic cycles according to a preferred embodiment of the present disclosure.

Please refer to FIG. 13, which is a schematic diagram of the quality factor QF and the transmittance T with respect to the number N of periodic cycles according to a preferred embodiment of the present disclosure. The horizontal axis represents the number N of periodic rings of the optical crystal continuous ring 30L1, 30R1 in FIG. 9A, the left vertical axis represents the quality factor QF, and the right vertical axis represents the transmittance T. The solid hollow circle represents the quality factor QF under the condition of the conjugate interface state CIS, the solid hollow triangle represents the quality factor QF under the condition of the conjugate topological interface state CTIS, and the solid circle represents the quality factor QF under the condition of the interface state IS. The solid triangle represents the quality factor QF under the condition of the topological interface state TIS. The dashed hollow circle represents the transmittance T under the condition of the conjugate interface state CIS, the dashed hollow triangle represents the transmittance T under the condition of the conjugate topology interface state CTIS, the dotted pattern circle represents the state of the interface state IS, and the dotted pattern triangle represents the transmittance T under the topological interface state TIS. It can be seen from FIG. 13, when the number of periodic loops N gradually increases, the quality factor QF will also increase in any state including CIS, CTIS, IS, and TIS. In the absence of conjugate symmetry of the interface state IS and the topological interface state TIS without conjugate symmetry, not only the transmittance is relatively low, but also the transmittance decreases upon the increase of the quality factor QF, which affects the robustness of the optical apparatus. On the other hand, in the state of conjugate symmetric interface state CIS and conjugate symmetric topology interface state CTIS, the transmittance can still maintain close to 100% upon the increase of the quality factor QF, making the robust conjugate symmetric optics apparatus 30 robust and can resist the effects of manufacturing defects, so that the light at the interface between the first optical cell set SCRR-L and the second optical cell set SCRR-R achieves good characteristics of complete transmittance.

In addition to being used in optical transmission, optical apparatus having conjugate symmetry can also be used as optical switches or optical sensors. For example, a conductive film is used as an interface between two optical cell sets to connect two optical cell sets. By providing an on or off signal to the conductive film to control at least one of the transmission, reflection and absorption of light. It can also directly receive light to generate an electrical signal to measure the sensitivity of optical crystals as the light sensor.

Figure 14:
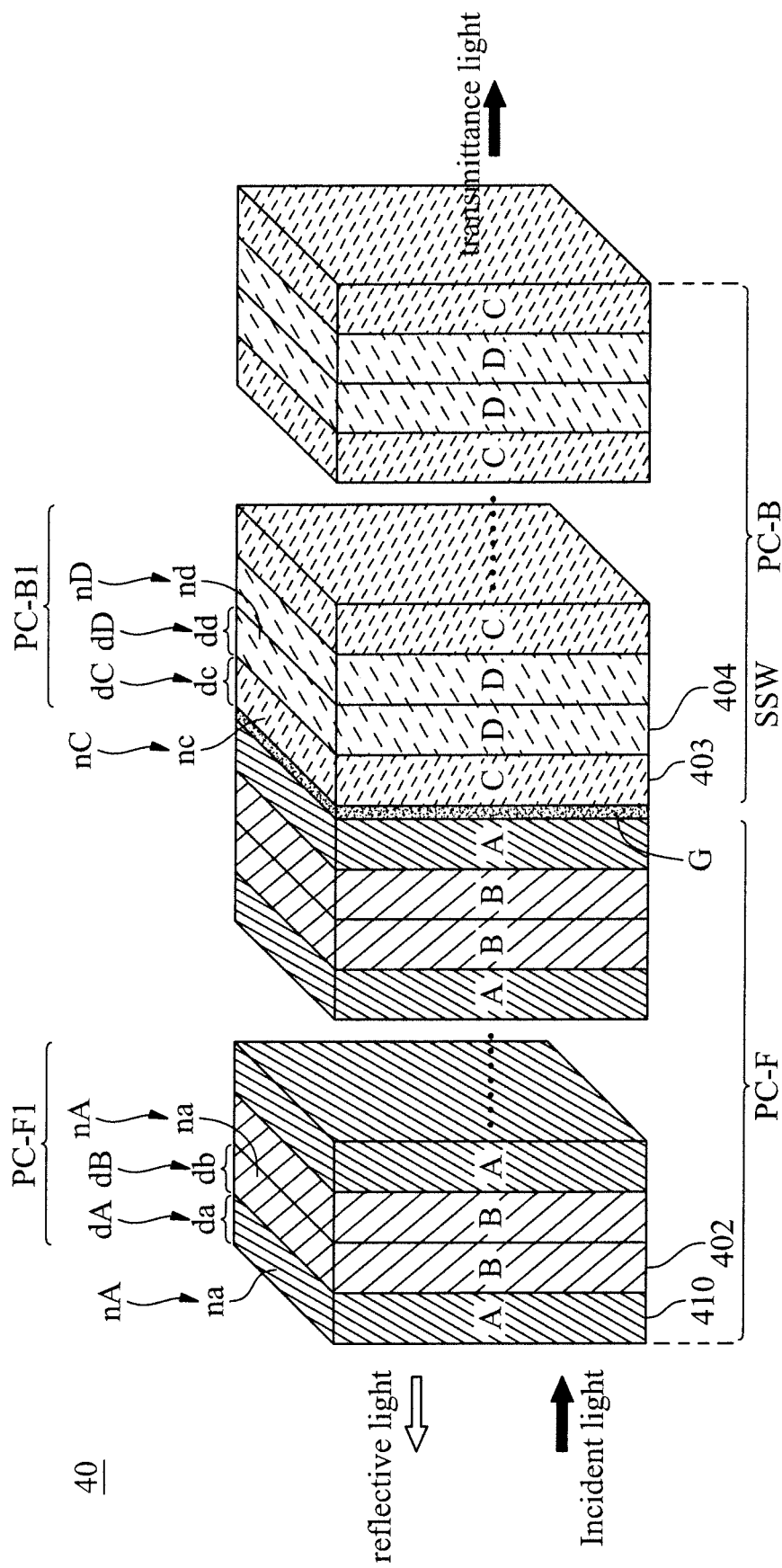
FIG. 14 shows a schematic diagram of the topology of another robust conjugate symmetric optical apparatus according to a preferred embodiment of the disclosure.
Figures 15A, 15B, 15C:
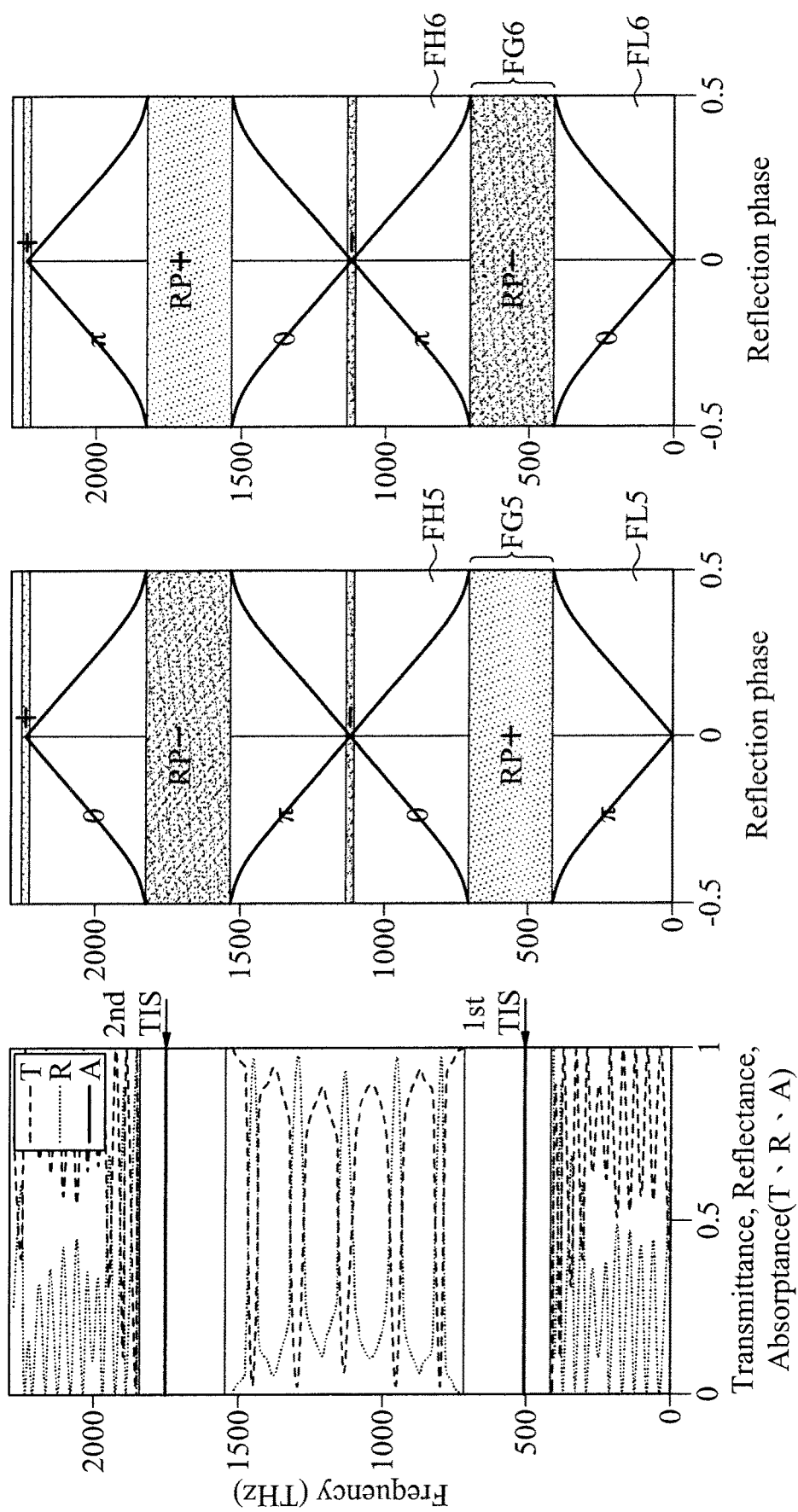
FIG. 15A shows a schematic diagram of the transmittance spectrum of the robust conjugate symmetric optical apparatus having the conductive film according to a preferred embodiment of the present disclosure.
FIGS. 15B and 15C show schematic diagram of the reflection phase of the robust conjugate symmetric optical apparatus having the conductive film according to a preferred embodiment of the present disclosure.

Please refer to FIG. 14, which is a schematic diagram of the topology of another robust conjugate symmetric optical apparatus 40 according to a preferred embodiment of the disclosure. The robust conjugate symmetric optical apparatus 40 includes a first optical cell set PC-F and a second optical cell set PC-B. Please refer to FIG. 15A, which is a schematic diagram of the transmittance spectrum of the robust conjugate symmetric optical apparatus 40 having the conductive film G according to a preferred embodiment of the present disclosure. The horizontal axis represents the transmittance T, reflectance R, and absorptance A of the conductive film G, and the vertical axis represents the frequency of light. Please refer to FIG. 15B, which is a schematic diagram of the transmission band structure and phase of the first optical cell set PC-F according to a preferred embodiment of the present disclosure. The horizontal axis represents the light reflection phase, and the patterned part represents the cutoff band. The blank and unpatterned part represents the passband. The 0 and π in the passband represent the digital transmission phase of light, and the vertical axis represents the frequency of light. Please refer to FIG. 15C, which is a schematic diagram of the transmission frequency band structure and phase of the second optical cell set PC-B according to a preferred embodiment of the present disclosure. The horizontal axis represents the reflected phase of light, and the vertical axis represents the frequency of light. In FIGS. 15B and 15C, RP+ represents the reflection phase is positive, and RP− represents the reflection phase is negative.

Please refer to FIGS. 14, 15A, 15B and 15C together. The first optical cell set PC-F includes a first plurality of cells PC-F1~PC-FN. Each of the first plurality of cells PC-F1~PC-FN includes a first left half cell 405L and a first right half cell 405R, and the first left half cell 405L and a first right half cell 405R has a first symmetric structure. The second optical cell set PC-B includes a second plurality of cells PC-B1~PC-BN, and each of the second plurality of cells PC-B1~PC-BN includes a second left half cell 406L and a second right half cell 406R. The second left half cell 406L and a second right half cell 406R have a second symmetric structure, wherein: the first left half cell 405L of the first optical cell set PC-F1 is the same with the second right half cell 406R of the second optical cell set PC-B1; and the right half cell 405R of the first optical cell set PC-F1 is the same with the second left half cell 406L of the second optical cell set PC-B1.

In a preferred embodiment of the present disclosure, the robust conjugated symmetric optical element 40 further includes an intermediate material, the intermediate material is a dielectric material, a conductive film G or a semiconductor, and the conductive film G may include a single layer graphene or multiple layers of graphene.

In a preferred embodiment of the present disclosure, the first optical cell set PC-F has a first light cutoff frequency band FG5 for forming a first reflection phase RP+, and the second optical cell set PC-B has a second light cut-off band FG6 having a second reflection phase RP−. Both the first light cut-off band FG5 and the second light cut-off band FG6 are continuous cut-off bands, and are at least a partial overlapped between them. There is a first condition that a first reflection phase RP+ and the second reflection phase RP− are opposite to each other. There is a second condition as follows: The optical digital transmission phases of a first low frequency band FL5 and a first high frequency band FH5 adjacent to the first light cutoff frequency band FG5 are in opposite phases, and the optical digital transmission phases of a second low frequency band FL6 and a second high-frequency band FH6 adjacent to the second light cutoff frequency band FG6 are opposite to each other, the optical digital transmission phases of the first low-frequency band FL5 and the second low-frequency band FL6 are opposite to each other, and the optical digital transmission phases of the first high-frequency band FH5 and the second high frequency band FH6 are opposite each other. The robust conjugate symmetric optical element 40 meets the first or the second condition.

In another preferred embodiment of the present disclosure, the robust conjugate symmetric optical element 40 meets the first and second conditions.

In any embodiment of the present disclosure, the first optical cell set PC-F includes a first plurality of units 401 and a second plurality of units 402. Each of the first plurality of units 401 has a first metric parameter dA and a first optical parameter nA. Each of the second plurality of units 402 has a second metric parameter dB and a second optical parameter nB. The second optical cell set PC-B includes a third plurality of units 403 and a fourth plurality of units 404. Each of the third plurality of units 403 has a third metric parameter dC and a third optical parameter nC. Each of the fourth plurality of units 404 has a fourth metric parameter dD and a fourth optical parameter nD. The conductive film G is disposed between the first optical cell set PC-F and the second optical cell set PC-B. The conductive film G can be used to: receive a first electrical signal, such as a switch control signal, to absorb or reflect a first light energy respectively; or absorb a second light energy to generate a second electrical signal SE, such as the light detection signal. Each of the first plurality of units 401 and each of the second plurality of units 402 are combined periodically with each other, the first optical cell set PC-F has a first factor F1 related to a light path, and the first factor F1 is obtained by calculating the first metric parameter dA and the second metric parameter dB. The third plurality of unit 403 and the fourth plurality of unit 404 are periodically combined with each other. The second optical cell set PC-B has a second factor F2 related to the optical path, and the second factor F2 is obtained by calculating the third metric parameter dC and the fourth metric parameter dD. Each of the first, second, third, and fourth optical parameters nA, nB, nC, nD affects a light propagation direction.

In any embodiment of the present disclosure, each of the first plural units 401 is a first unit layer A, each of the second plural units 402 is a second unit layer B, and each of the third plural units 403 is a third unit layer C, and each of the fourth plural units 404 is a fourth unit layer D. The first left half cell 405L includes the unit layer A and layer B, the first right half cell 405R includes the unit layer B and layer A, and each of the first plurality of cells PC-F1~PCFN conforms to a first topological configuration ABBA. The second left half cell 406L includes the unit layer C and layer D, the second right half cell 406R includes the unit layer D and layer C, and each of the second plurality of cells PC-B1~PCBN conforms to a second topological configuration CDDC. The first, second, third, and fourth optical parameters nA, nB, nC, nD are the refractive indices na, nb, nc, and nd of the optical unit layers A, B, C, and D. The first metric parameter dA is a first thickness da of the first optical unit layer A, the second metric parameter dB is a second thickness db of the second optical unit layer B, and the third metric parameter dC is a third thickness dc of the third optical unit layer C, and the fourth metric parameter dD is a fourth thickness dd of the fourth optical unit layer D. At least a part of the first topology configuration is arranged periodically in ABBA based on the first and second metric parameters dA, dB, and at least a part of the second topology configuration is arranged periodically in CDDC based on the third and fourth metric parameters dC, dD. Different from the aforementioned robust conjugate symmetric optical apparatus, the first factor is $F1=da\times na/(da\times na+db\times nb)$; and the second factor is $F2=dc\times nc/(dc\times nc+dd\times nd)$.

In one embodiment, the first left half cell 405L includes a first unit layer A and a layer B to form a first left half cell continuous (or adjacent) layer AB. The first right half cell 405R includes a first unit layer B and a layer A to form a first right half cell continuous layer BA. The second left half cell 406L includes a second unit layer B and a layer A to form a second left half cell continuous layer BA. The second right half cell 406R includes a second unit layer A and a layer B to form a second right half cell continuous layer AB.

Please refer to FIGS. 16A to 16D, which are schematic diagram of the preferred embodiments of the present disclosure, showing that the absorptance A of the topological optical apparatus of different types Type 1 to Type 4 varies with the number of periodic layers N of the first optical cell set PC-F. The horizontal axis represents the periodic layer number NF of the first optical cell set PC-F, and the vertical axis represents the transmittance, reflectance, and absorptance of the conductive film G The transmittance is represented by a long dashed line, the reflectance is represented by a short dash line, and the absorptance is represented by a solid line. The following examples illustrate the effects of transmittance, reflectance, and absorptance of conductive film G In FIGS. 16A to 16D, the number of periodic layers of the second optical cell set PC-B is 9. The factor F1 is 0.3 except in FIG. 16B, which is 0.5.

Figure 16A:
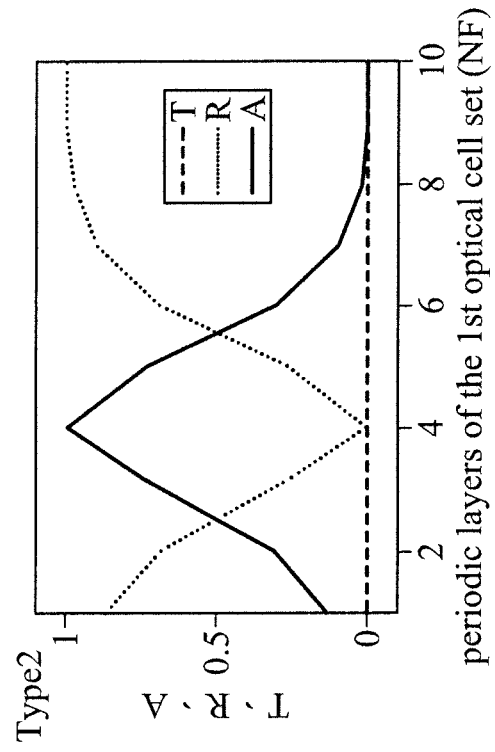
FIGS. 16A to 16D show schematic diagrams of the absorptance of the topological optical apparatus of different types Type 1 to Type 4 varies with the number of periodic layers N of the first optical cell set according the preferred embodiments of the present disclosure.
Figure 16B:
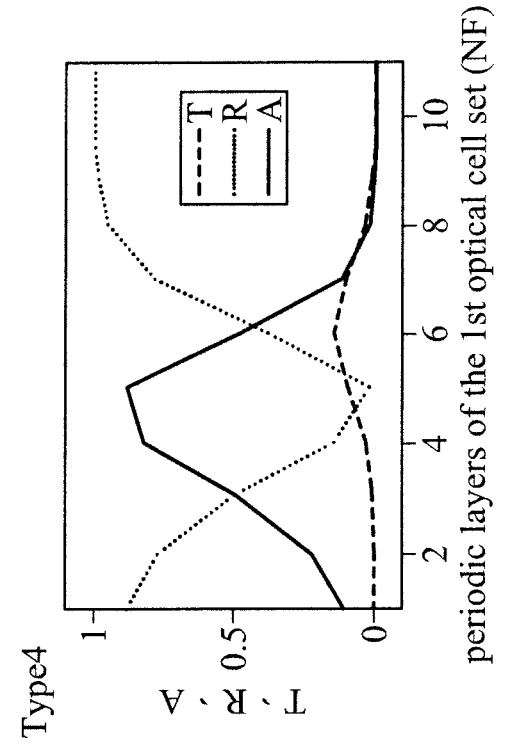
Figure 16C:
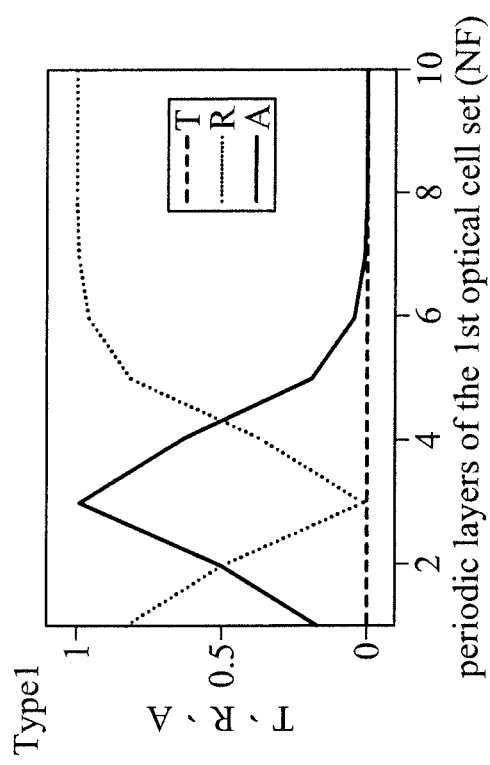
Figure 16D:
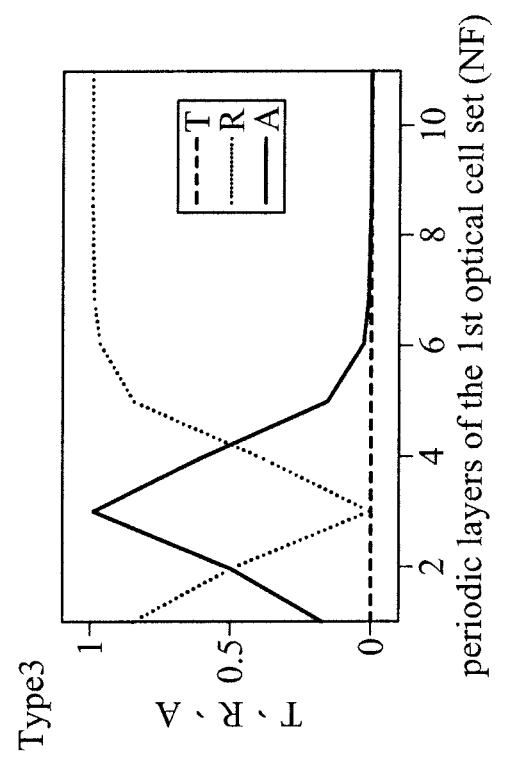

From FIG. 16A, it can be seen that when the number of periodic layers of the first optical cell set PC-F of Type1 is NF=3, the conductive film G has the largest absorption rate A, and the increasing total number of periodic layers NF+NB will not change the absorption rate A, that is, the absorption rate of the number N of asymmetric periodic layers is better than that of the number N of symmetric periodic layers. On a condition that the first factor F1 changes from 0.3 to 0.5 to form Type2, the maximum absorption rate A of the conductive film G appears when the number of periodic layers NF=4, as shown in FIG. 16B. Then, when the refractive index of the first plurality of optical units 401 changes from 3.48 to 4.48 to form Type3, and then it changes from 3.48 to 4.48 to form Type4. The transmittance T in FIGS. 16A to 16D is almost 0 in a certain frequency range, and the light energy absorbed by the conductive film G is just inversely proportional to the light energy reflected.

Figure 17A:
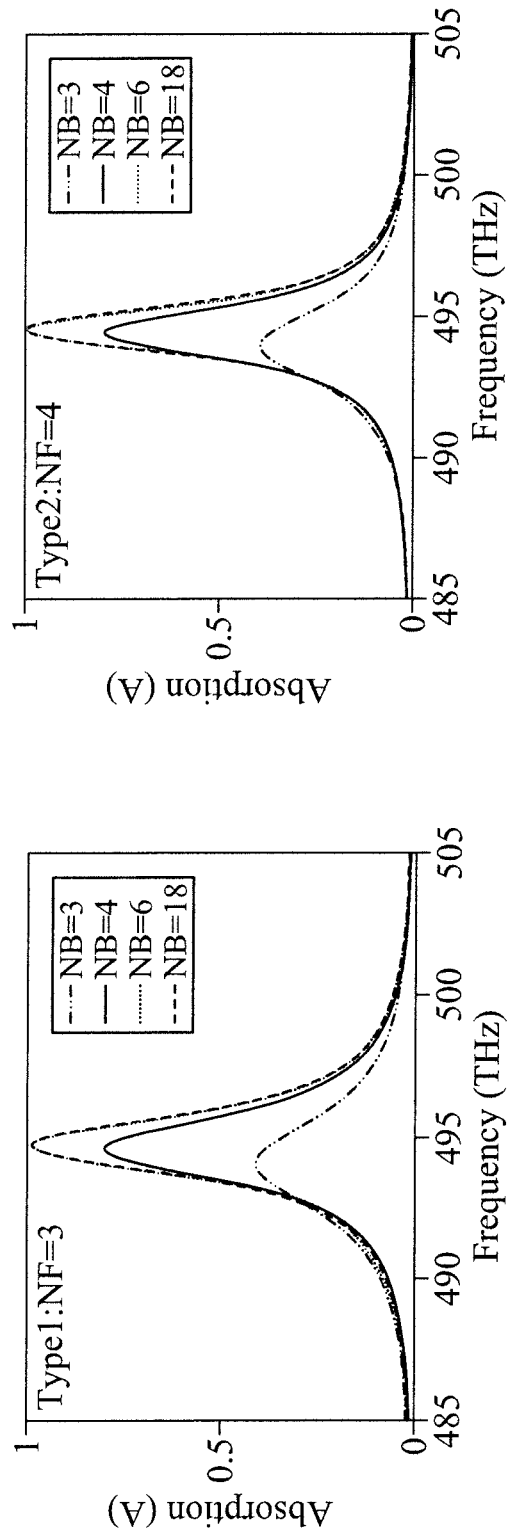
FIGS. 17A to 17D show schematic diagrams of the change of the absorptance of the conductive film G upon the number of asymmetric periodic layers according to the preferred embodiment of the disclosure.
Figure 17B:
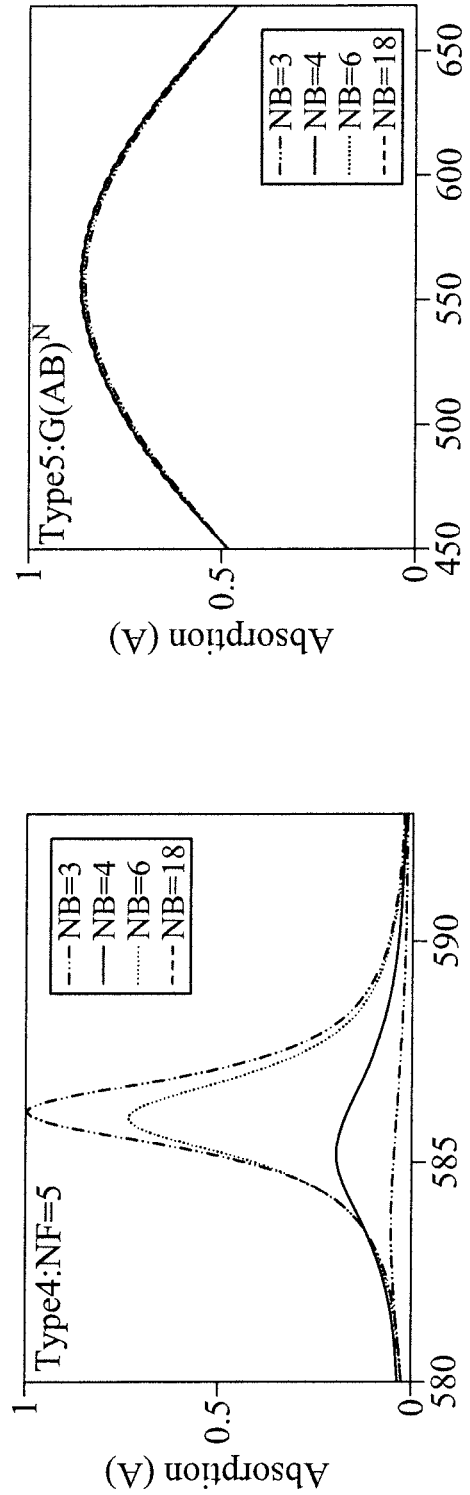
Figure 17C:
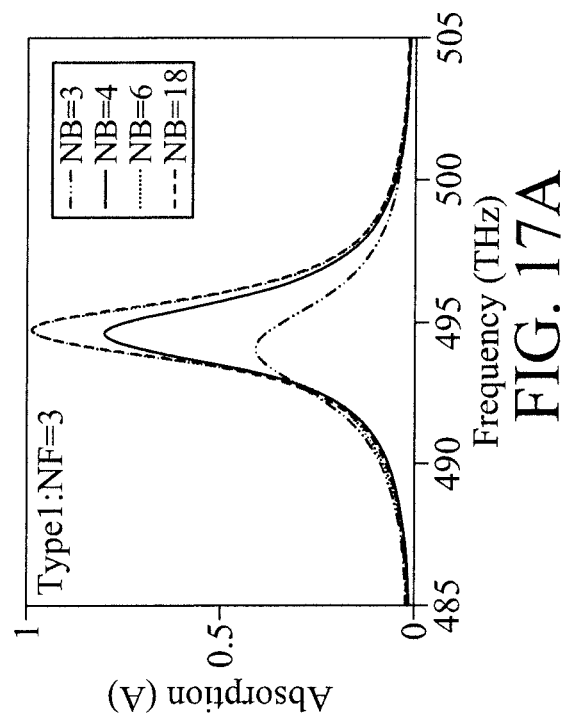
Figure 17D:
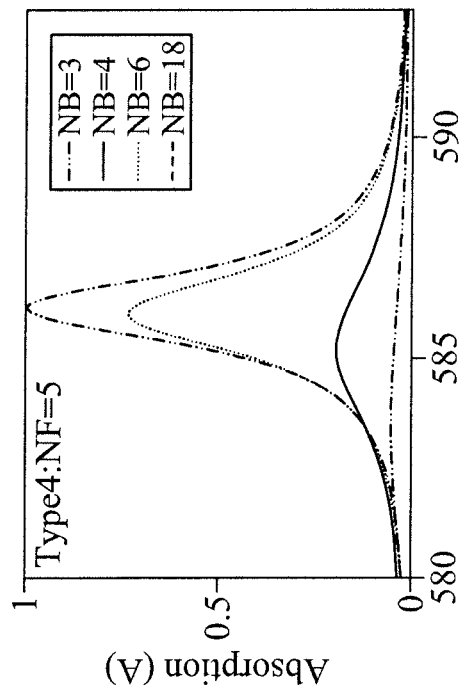

Please refer to FIGS. 17A to 17D, which are schematic diagrams showing the change of the absorptance A of the conductive film G upon the number of asymmetric periodic layers according to the preferred embodiment of the disclosure. FIGS. 17A to 17C are examples of the absorptance of the conjugated conductive film G with respect to a specific frequency range, and FIG. 17D shows examples of the relative absorptance of the non-conjugated conductive film G. for specific frequency ranges. It can be seen from FIGS. 17A-17C, the more asymmetrical the number of periodic layers NF of the first optical cell set PC-F and the number of periodic layers NB of the second optical cell set PC-B are, the more the absorption rate A of the conductive film is good, and the absorption rate can be close to 100%. However, the absorption rate A of the general non-conjugated symmetrical conductive film G has no effect, and the maximum absorption rate is only less than 1% at a frequency of 550 THz, which is not suitable as an optical switch.

In any embodiment of the present disclosure, the intermediary substance is a dielectric material, a conductive film or a semiconductor, and the conductive film G includes a single layer of graphene or multiple layers of graphene. When the conductive film G receives the first electrical signal, the conductive film G acts as an optical switch, and when the conductive film G absorbs the second light energy, the conductive film G acts as a light detector. The conductive film G has a light energy absorptance A, a light energy reflectance R, a light energy transmittance T, a threshold value, and a first threshold range. When the conductive film G is used as the optical switch or the optical detector, the light energy transmittance is close to zero in a specific frequency range, and the light energy absorptance A is close to 100%. The first optical cell set PC-F has N groups of periodicity. The first plurality of optical units 401 and the second plurality of optical units 402 are successively combined with each other. When the conductive film G receives an electrical signal including a turn-on instruction, and the number of layers of the first optical cell set PC-F and the second optical cell set PC-B is asymmetric, the light energy absorptance A of the conductive film G at a specific frequency of light is higher than absortance A when the number of layers of the first optical cell set PC-F and the second optical cell set PC-B is symmetric, and the light energy reflectance R of the conductive film G at a specific frequency of light is lower than reflectance R when the number of layers of the first optical cell set PC-F and the second optical cell set PC-B is symmetric, Please refer to FIGS. 18A to 18D, which are schematic diagrams of the absorptance A and the chemical energy μc of the conductive film G according to a preferred embodiment of the present disclosure. The horizontal axis represents the chemical energy of the single-layer conductive film C, in units of electron volts eV, In FIGS. 17 A to 17D. when the second light energy is less than or equal to a first threshold value TH1, for example, when μc is about 1 eV, The conductive film G substantially completely absorbs and does not reflect the second light energy. When the second light energy is greater than the first threshold value TH1, for example, μs about 1 eV, the conductive film G does not substantially absorb and completely reflects the second light energy, as shown in FIGS. 18A to 18C. In FIG. 18D, the general unconjugated optical apparatus has a conductive film G, having a second threshold TH2, wherein the first threshold Till is smaller than the second threshold TH2. It can be seen that the non-robust conjugate symmetric optical element containing the conductive film G does not have good digital characteristics and is not suitable for use as an optical switch or photo sensor. On the contrary, the robust conjugate symmetric optical apparatus 40 containing the conductive film G has good digital characteristics, and it is suitable as an optical switch or optical sensor.

Figure 19:
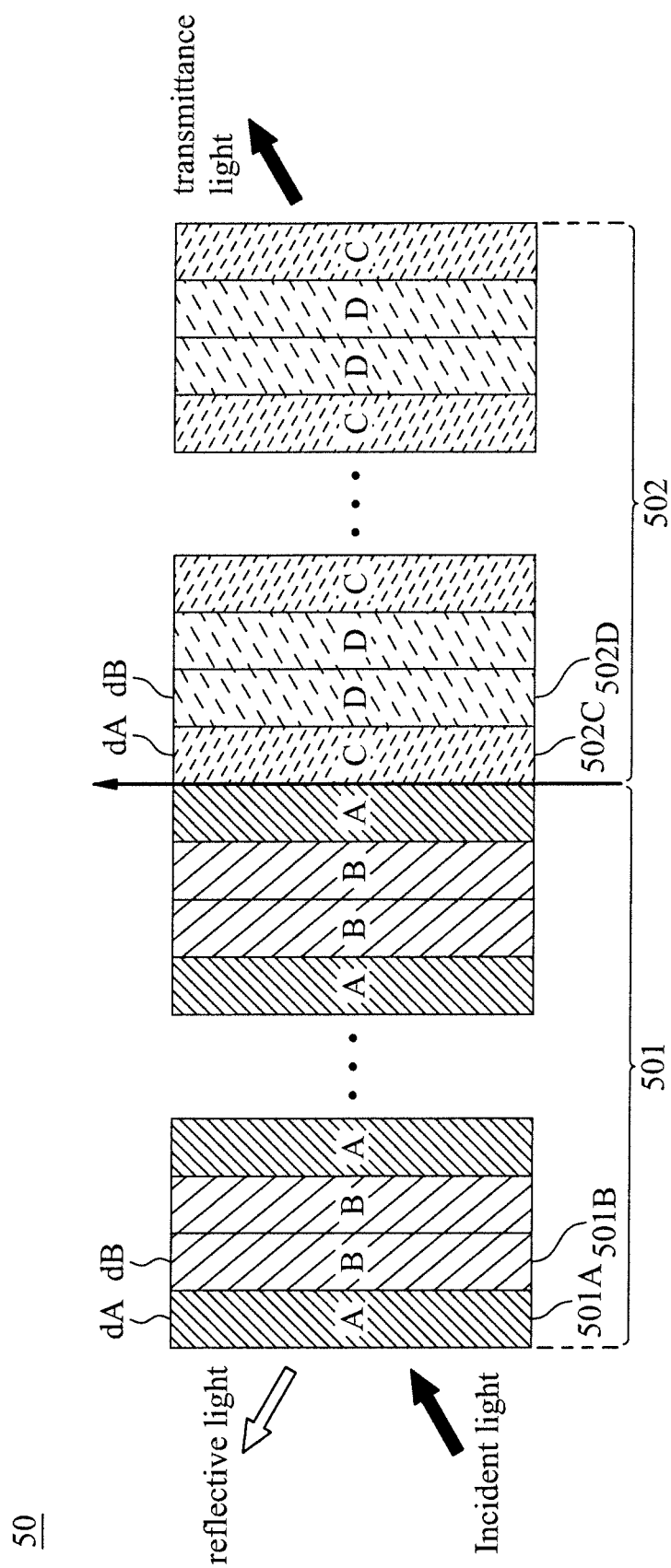
FIG. 19 shows a schematic diagram of the robust conjugate symmetric optical apparatus according to a preferred embodiment of the present disclosure.

Please refer to FIG. 19, which is a schematic diagram of the robust conjugate symmetric optical apparatus 50 of a preferred embodiment of the present disclosure. The robust conjugate symmetric optical element 50 includes a first optical cell set 501 and a second optical cell set 502. The first optical cell set 501 includes first plurality of cells 501-1 to 501-N, and each of the first plurality of cells 501-1 to 501-N includes a first left half cell 501L and a first right. There is a first symmetric structure between the first left half cell 501L and the first right half cell 501R. The second optical cell set 502 includes second plurality of cells 502-1~502-N, and each of the second plurality of cells 502-1~502-N includes a second left half cell 502L and a second right half cell 502R. There is a second symmetric structure between the second left half cell 502L and the second right half cell 502R, wherein the first left half cell 501L of the first optical cell set 501 and the second right half cell 502R of the second optical cell set 502 have the same structure; and the first right half cell 501R of the first optical cell set 501 and the second left half cell 502L of the second optical cell set 502 have the same structure, that is, D=A and C=B.

In any embodiment of the present disclosure, each of the first plurality of units 501A has a first metric parameter dA, and each of the second plurality of units 501B has a second metric parameter dB. Each of the third plurality of units 502C has a third metric parameter dC, and each of the fourth plurality of units 502D has a fourth metric parameter dD, Each of the first plurality of units 501A and each of the second plurality of units 501B periodically and consecutively combine together, the first optical cell set 501 has a first factor F1, FSRL related to a specific light path, and the first factor F1, FSRL is a fraction and is obtained by calculating the first metric parameter dA and the the second metric parameter dB. Each of the third plurality of units 502C and each of the fourth plurality of units 502D are combined periodically with each other, and the second optical cell set 502 has a second factor F2, FSRR related to the specific optical path, and the second factor F2, FSRR is a fraction obtained by calculating the third metric parameter dC and the fourth metric parameter dD, and the sum of the first factor F1, FSRL and the second factor F2, FSRL is equal to 1.

The robust conjugate symmetric optical apparatus 50 in FIG. 19 can be combined with the aforementioned layered or ring-shaped optical apparatus to form a layered robust conjugate symmetric optical apparatus 20, 40 or ring-shaped robustness conjugate symmetric optical element 30, and therefore they are not described again in detail.

The present disclosure provides a design method for a robust conjugate symmetric optical apparatus, comprising the following steps of: providing a first optical cell set, wherein the first optical cell set includes a first plurality of cells, each of the first plurality of cells includes a first left half cell and a first right half cell, each of the left half cells includes a plurality of units, and the respective first right half cell and the corresponding first left half cell form a first symmetric structure; providing a second optical cell set, wherein the second optical cell set includes a second plurality of cells, each of the second plurality of cells includes a second left half cell and a second right half cell, and the respective second right half cell and the corresponding second left half cell form a second symmetric structure; causing the same either the first left half cell of the first optical cell set and the second right half cell of the second optical cell set, or the first right half cell of the first optical cell set and the second left half cell of the second optical cell set, wherein the first optical cell set has a first light cutoff band of a first reflection phase, and the second optical cell set has a second light cutoff band of a second reflection phase; and obtaining at least one of a first and second conditions as follows: in the first condition, causing continuous either of the first light cutoff band and the second light cutoff band overlapping at least a part thereof, where the first reflection phase and the second reflection phase are opposite to each other; and in the second condition, causing mutually opposite any one phase pair of optical digital transmission phases of a first low frequency band and a first high frequency band adjacent to the first light cutoff frequency band, optical digital transmission phases of a second low frequency band and a second high frequency band adjacent to the second light cutoff frequency band, optical digital transmission phases of the first low frequency band and the second low frequency band, and optical digital transmission phases of the first high frequency band and the second high frequency band.

In any embodiment of the present disclosure, the first left half cell includes a first unit layer a and a first unit layer b to form a first continuous left half cell synthetic layer ab; the first right half cell includes a first unit layer b and a first unit layer a to form a first continuous right half cell synthetic layer ba; the second left half cell includes a second unit layer b and a second unit layer a to form a second continuous left half cell synthetic layer ba; and the second right half cell includes a second unit layer a and a second unit layer b to form a continuous second right half cell synthetic layer ab.

In any embodiment of the present disclosure, the first left half cell includes a first unit right half ring a' and a first unit left half ring b to form a first left half cell adjacent half ring set a'b; the first right half cell includes a first unit right half ring b' and a first unit left half ring a to form a first right half cell adjacent half ring set b'a; the first left half cell adjacent half ring a'b set and the first right half cell adjacent half ring b'a set form an adjacent half ring set a'bb'a of the first cell: the second left half cell includes a second unit right half ring b' and a second unit left half ring a to form a second left half cell adjacent ring set b'a; the second right half cell includes a second unit right half ring a' and a second unit left half ring b to form a second right half cell adjacent half ring set a'b; the second left half cell adjacent half ring set b'a and the second right half cell adjacent half ring set a'b form an adjacent half ring set b'aa'b of the second cell; the robust conjugate symmetric optical apparatus has a half ring structure including at least one of a linear structure and a curved structure; and on the condition that a path length of the half ring structure is equal to that of the other half ring structure, the two half ring structures are regarded equivalent.

In any embodiment of the present disclosure, each of the first and second optical cell sets is a dielectric material, a conductor, or a semiconductor. The robust conjugate symmetric optical apparatus further includes an intermediate substance, which includes NM units having a first number being greater than or equal to zero; and each of the NM units is a dielectric material, a conductor or a semiconductor, and the conductor includes a single layer of graphene or multiple layers of graphene.

Figure 20A:
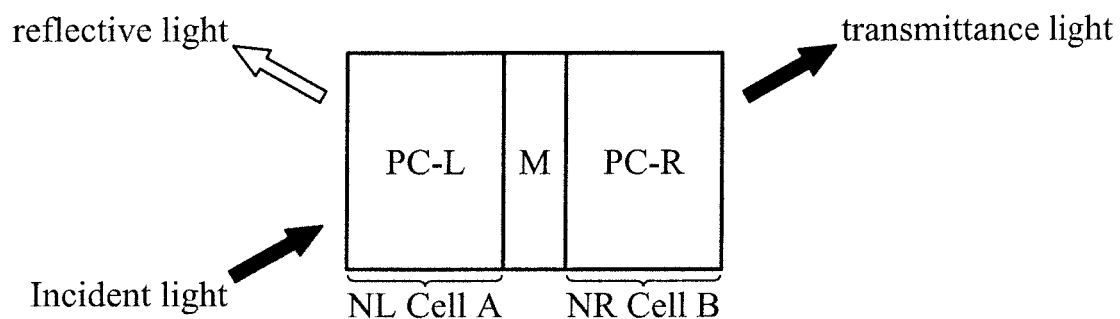
FIG. 20A shows a schematic diagram of the robust conjugate symmetric optical apparatus according to a preferred embodiment of the present disclosure.
Figure 20B:
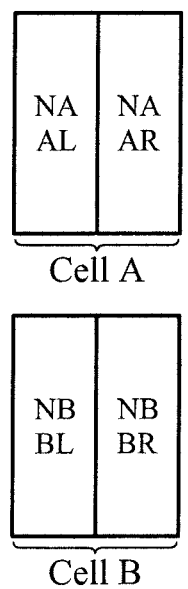
FIG. 20B shows a schematic diagram of the Cell A/Cell B in the first/second optical cell set according to the preferred embodiment of the present disclosure.
Figure 20C:
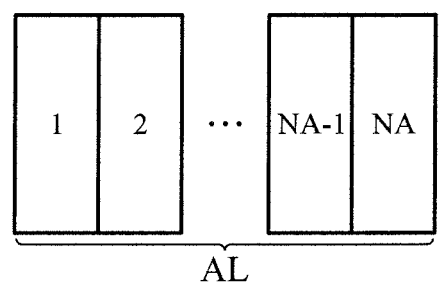
FIG. 20C shows a schematic diagram of the first/second left half cell AL/BL in the first/second optical cell set according to the preferred embodiment of the present disclosure.
Figure 20C:
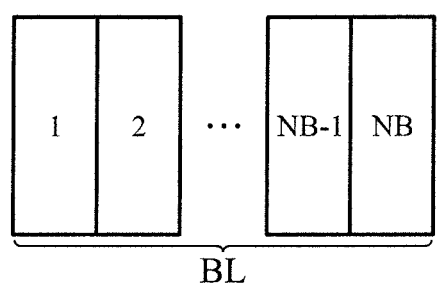
Figure 20D:
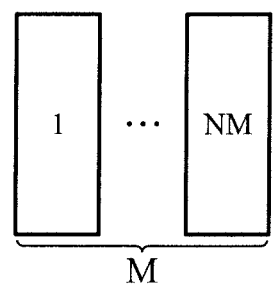
FIG. 20D shows a schematic diagram of the intermediate substance M in the robust conjugated symmetric optical apparatus according to the preferred embodiment of the present disclosure.

Please refer to FIG. 20A, which is a schematic diagram of the robust conjugate symmetric optical apparatus 80 according to a preferred embodiment of the present disclosure. Please refer to FIG. 20B, which is a schematic diagram of the Cell A/Cell B in the first/second optical cell set PC-L/PC-R according to the preferred embodiment of the present disclosure. Please refer to FIG. 0OC, which is a schematic diagram of the first/second left half cell AL/BL in the first/second optical cell set PC-L/PC-R according to the preferred embodiment of the present disclosure. Please refer to FIG. 20D, which is a schematic diagram of the intermediate substance M in the robust conjugated symmetric optical apparatus 80 according to the preferred embodiment of the present disclosure. Please refer to FIGS. 20A to 20D together. The robust conjugated symmetric optical apparatus 80 includes a first optical cell set PC-L, an intermediate material M, and a second optical cell set PC-R. The first optical cell set PC-L includes NL cells Cell A, each of the NL cells Cell A includes NA first left half cells AL and NA first right half cells AR, and the NA first left half cell AL and the NA first right half cell AR have a first mirror symmetry structure, where NL≥2 and NA≥2. The intermediate substance M contains NM units, and NM≥0. The second optical cell set PC-R includes NR cells Cell B, each of the NR cells includes NB second left half cells BL and NB second right half cells BR, and there is a second mirror symmetry structure between the NB second half cell BL and the NB second right half cells BR, where NR≥2 and NB≥2, and wherein the first left half cell AL of the first optical cell set PC-L is the same as the second right half cell BR of the second optical cell set PC-R; and the first right half cell AR of the first optical cell set PC-L is the same as the second left half cell BL of the second optical cell set PC-R.

In any embodiment of the present disclosure, the robust conjugate symmetric optical apparatus 80 includes a one-dimensional layer structure or a one-dimensional ring structure; on the condition that the robust conjugate symmetric optical apparatus 80 has the one-dimensional layer structure, each of the first NA units and the second NB units is a single-layer homogeneous structure; a material of the single-layer homogeneous layer structure is a dielectric material, a semiconductor, or a conductor, and a material of each of the NM units is a dielectric material, a semiconductor, or a conductor; and on the condition that the robust conjugate symmetric optical apparatus is the one-dimensional ring structure, each of the NA first units and the NB second units is a half ring structure, and the half ring structure includes at least one of a linear structure and a curved structures; on the condition that a path length of the half-ring structure is equal to that of the other half ring structure, the two half ring structures are regarded equivalent; and a material of the half ring structure is a dielectric material, a conductor, or a semiconductor, and a material of each NM unit is a dielectric material, a semiconductor, or a conductor.

In any embodiment of the present disclosure, the first optical cell set PC-L has a first light cutoff frequency band FG1 of a first reflection phase RF1, and the second optical cell set PC-R has a second light cutoff frequency band FG2 of a second reflection phase RF2; and the robust conjugate symmetric optical apparatus 80 meets at least one of a first and a second conditions as follows: in the first condition, both the first light cutoff frequency band FG1 and the second light cutoff frequency band FG2 are continuous cutoff bands and are partly overlapped, and the first reflection phase RP1 and the second reflection phase RP2 are opposite to each other; and in the second condition, optical digital transmission phases of a first low frequency band FL1 and a first high frequency band FH1 adjacent to the first light cutoff frequency band FG1 are opposite to each other, optical digital transmission phases of a second low frequency band FL2 and a second high frequency band FH2 adjacent to the second light cutoff frequency band FG2 are opposite to each other, optical digital transmission phases of the first low frequency band FL1 and the second low frequency band FL2 are opposite to each other, and optical digital transmission phases of the first high frequency band FH1 and the second high frequency band FH2 are opposite to each other.

In any preferred embodiment of the present disclosure, the first left half cell AL includes a first unit layer a and a layer b to form a first left half cell continuous layer ab; the first right half cell AR includes a first unit layer b and a layer a to form a first right half cell continuous layer ba; the second left half cell BL includes a second unit layer b and layer a to form a second left half cell continuous layer ba; and the second right half cell BR includes a second unit layer a and layer b to form a second right half cell continuous layer ab.

In any preferred embodiment of the present disclosure, the first left half cell AL includes a first unit right half ring a' and a first unit left half ring b to form a first left half cell adjacent half ring set a'b; the first right half cell AR includes a first unit right half ring b' and a first unit left half ring a to form a first right half cell adjacent half ring set b'a; the first left half cell AL adjacent half ring a'b set and the first right half cell AR adjacent half ring b'a set form an adjacent half ring a'bb'a set of the first cell: the second left half cell BL includes a second unit right half ring b' and a second unit left half ring a to form a second left half cell adjacent ring set b'a; the second right half cell BR includes a second unit right half ring a' and a second unit left half ring b to form a second right half cell adjacent half ring set a'b; the second left half cell BL adjacent half ring b'a set and the second right half cell BR adjacent half ring set a'b of the form an adjacent half ring b'aa'b of the second cell; the robust conjugate symmetric optical apparatus 80 has a half ring structure including at least one of a linear structure and a curved structure; and on the condition that a path length of the half ring structure is equal to that of the other half ring structure, the two half ring structures are regarded equivalent.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A robust conjugate symmetric optical apparatus, comprising:
   a first optical cell set including a first plurality of cells, each of which includes a first left half cell and a first right half cell, each of the first left half cells has a plurality of units, and the respective first right half cell and the corresponding first left half cell form a first symmetric structure; and
   a second optical cell set including a second plurality of cells, each of which includes a second left half cell and a second right half cell, and the respective second right half cell and the corresponding second left half cells form a second symmetric structure, wherein:
   each of the first left half cells of the first optical cell set and each of the second right half cells of the second optical cell set have the same structure;
   each of the first right half cells of the first optical cell set and each of the second left half cells of the second optical cell set have the same structure;
   the first optical cell set has a first light cutoff frequency band of a first reflection phase, and the second optical cell set has a second light cutoff frequency band of a second reflection phase;
   the first and the second light cutoff frequency bands are both continuous cutoff bands being partly overlapped under a first condition that the first and the second reflection phases are opposite;
   there is a second condition that a first low frequency band and a first high frequency band are adjacent to the first light cutoff frequency band, an optical digital transmission phase of the first low frequency band and that of the first high frequency band are opposite to each other, a second low frequency band and a second high frequency band are adjacent to the second light cutoff frequency band, an optical digital transmission phase of the second low frequency band and that of the second high frequency band are opposite to each other, the optical digital transmission phase of the first low frequency band and that of the second low frequency band are opposite to each other, and the optical digital transmission phase of the first high frequency band and that of the second high frequency band are opposite to each other; and the robust conjugate symmetric optical apparatus meets both the first and the second conditions.

2. The optical apparatus as claimed in claim 1, wherein:
the first left half cell includes a first unit layer a and a first unit layer b to form continuous a first left half cell synthetic layer ab;
the first right half cell includes a first unit layer b and a first unit layer a to form a continuous first right half cell synthetic layer ba;
the second left half cell includes a second unit layer b and a second unit layer a to form a continuous second left half cell synthetic layer ba; and
the second right half cell includes a second unit layer a and a second unit layer b to form a continuous second right half cell synthetic layer ab.

3. The optical apparatus as claimed in claim 1, wherein:
the first left half cell includes a first unit right half ring a' and a first unit left half ring b to form a first left half cell adjacent half ring set a'b;
the first right half cell includes a first unit right half ring b' and a first unit left half ring a to form a first right half cell adjacent half ring set b'a;
the first left half cell adjacent half ring set a'b and the first right half cell adjacent half ring set b'a form an adjacent half ring set a'bb'a of the first cell:
the second left half cell includes a second unit right half ring b' and a second unit left half ring a to form a second left half cell adjacent ring set b'a;
the second right half cell includes a second unit right half ring a' and a second unit left half ring b to form a second right half cell adjacent half ring set a'b;
the second left half cell adjacent half ring set b'a and the second right half cell adjacent half rings a'b form an adjacent half ring b'aa'b of the second cell;
the robust conjugate symmetric optical component has a half ring structure including at least one of a linear structure and a curved structure; and
on the condition that a path length of the half ring structure is equal to that of the other half ring structure, the two half ring structures have the same structure.

4. The optical apparatus as claimed in claim 1, wherein:
each of the first and second optical cell sets is a dielectric material, a conductor, or a semiconductor;
the robust conjugated symmetric optical apparatus further includes an intermediate substance, which includes NM units having a number, and the number is greater than or equal to zero; and
each of the NM units is formed of a dielectric material, a conductor or a semiconductor, and the conductor includes a single layer of graphene or multiple layers of graphene.

5. A robust conjugate symmetric optical apparatus, comprising:

a first optical cell set including a first plurality of cells, each of which includes a first left half cell and a first right half cell, and the respective first right half cell and the corresponding first left half cells form a first symmetric structure therebetween; and
a second optical cell set including a second plurality of cells, each of which includes a second left half cell and a second right half cell, and the respective second right half cell and the corresponding second left half cells form a second symmetric structure therebetween, wherein:
each of the first left half cells of the first optical cell set and each of the second right half cells of the second optical cell set have the same structure; and
each of the first right half cells of the first optical cell set and each of the second left half cells of the second optical cell set have the same structure.

6. The optical apparatus as claimed in claim 1, wherein:
the robust conjugate symmetric optical apparatus further includes an intermediary substance disposed between the first optical cell set and the second optical cell set;
the intermediate substance contains NM units having a number, and the number is greater than or equal to zero;
the robust conjugate symmetric optical apparatus includes a one-dimensional layered structure or a one-dimensional ring structure;
each of the first left half cells has a first plurality of units, and each of the second left half cells has a second plurality of units;
on the condition that the robust conjugate symmetric optical apparatus has the one-dimensional layered structure, each of the first plurality of units, the NM units and the second plurality of units is a single-layer homogeneous structure, and a material of the single-layer homogeneous layer structure is a dielectric material, a semiconductor or a conductor;
on the condition that the robust conjugate symmetric optical apparatus has the one-dimensional ring structure, each of the first plurality of units, the NM units, and the second plurality of units is a half ring structure, and the half ring is a dielectric material, a semiconductor, or a conductor, wherein the number is greater than zero; and
the intermediate substance is a dielectric material, a conductor or a semiconductor, and the conductor includes a single layer of graphene or multiple layers of graphene.

7. The optical apparatus as claimed in claim 5, wherein:
the first optical cell set has a first light cutoff frequency band of a first reflection phase, and the second optical cell set has a second light cutoff frequency band of a second reflection phase; and
the robust conjugate symmetric optical apparatus meets one of a first and a second conditions as follows:
in the first condition, the first and the second light cutoff frequency bands are both continuous cutoff bands and partly overlapped, and the first and the second reflection phases are opposite to each other; and
in the second condition, a first low frequency band and a first high frequency band are adjacent to the first light cutoff frequency band, an optical digital transmission phase of the first low frequency band and that of the first high frequency band are opposite to each other, a second low frequency band and a second high frequency band are adjacent to the second light cutoff frequency band, an optical digital transmission phase of the second low frequency band and that of the second high frequency band are opposite to each other, the optical digital transmission phase of the first low frequency band and that of the second low frequency band are opposite to each other, and the optical digital transmission phases of the first high frequency band and that of the second high frequency band are opposite to each other.

8. The optical apparatus as claimed in claim 5, wherein:
the first optical cell set has a first light cutoff frequency band of a first reflection phase, and the second optical cell set has a second light cutoff frequency band of a second reflection phase;
the first light cutoff frequency band and the second light cutoff frequency band are both continuous cutoff bands and partly overlapped under a first condition that the first reflection phase and the second reflection phase are opposite to each other;
there is a second condition that a first low frequency band and a first high frequency band are adjacent to the first light cutoff frequency band, an optical digital transmission phase of the first low frequency band and that of the first high frequency band are opposite to each other, a second low frequency band and a second high frequency band are adjacent to the second light cutoff frequency band, an optical digital transmission phase of the second low frequency band and that of the second high frequency band are opposite to each other, the optical digital transmission phases of the first low frequency band and that of the second low frequency band are opposite to each other, and optical digital transmission phases of the first high frequency band and the second high frequency band are opposite to each other; and
the robust conjugate symmetric optical component meets both the first and the second conditions.

9. A robust conjugate symmetric optical apparatus, comprising:
a first optical cell set, including:
NL cells, wherein each of the NL cells having a first number includes a first left half cell and a first right half cell, and the first left half cell includes NA first units having a second number, and the first right half cell and the first left half cell are symmetric, where either of the first and the second numbers is greater than or equal to 2;
an intermediate substance including NM units having a third number greater than or equal to 0; and
a second optical cell set, including:
NR cells, wherein each of the NR cells having a fourth number includes a second left half cell and a second right half cell, and the second left half cell includes NB second units having a fifth number, and the second right half cell and the second left half cell are symmetric, where either of the fourth and fifth numbers is greater than or equal to 2, wherein:
the first left half cell of the first optical cell set and the second right half cell of the second optical cell set have the same structure; and
the first right half cell of the first optical cell set and the second left half cell of the second optical cell set have the same structure.

10. The optical apparatus as claimed in claim 9, wherein:
the robust conjugate symmetric optical apparatus includes a one-dimensional layer structure or a one-dimensional ring structure;
on the condition that the robust conjugate symmetric optical apparatus has the one-dimensional layer structure, each of the first NA units and the second NB units is a single-layer homogeneous structure;
a material of the single-layer homogeneous layer structure is a dielectric material, a semiconductor, or a conductor, and a material of each of the NM units is a dielectric material, a semiconductor, or a conductor; and
on the condition that the robust conjugate symmetric optical apparatus is the one-dimensional ring structure, each of the NA first units and the NB second units is a half ring structure, and the half ring structure includes at least one of a linear structure and a curved structures;
on the condition that a path length of the half-ring structure is equal to that of the other half ring structure, the two half ring structures are regarded equivalent; and
a material of the half ring structure is a dielectric material, a conductor, or a semiconductor, and a material of each NM unit is a dielectric material, a semiconductor, or a conductor.

11. The optical apparatus as claimed in claim 9, wherein:
the first optical cell set has a first light cutoff frequency band of a first reflection phase, and the second optical cell set has a second light cutoff frequency band of a second reflection phase; and
the robust conjugate symmetric optical component meets at least one of a first and a second conditions as follows:
in the first condition, both the first light cutoff frequency band and the second light cutoff frequency band are continuous cutoff bands and are partly overlapped, and the first reflection phase and the second reflection phase are opposite to each other; and
in the second condition, optical digital transmission phases of a first low frequency band and a first high frequency band adjacent to the first light cutoff frequency band are opposite to each other, optical digital transmission phases of a second low frequency band and a second high frequency band adjacent to the second light cutoff frequency band are opposite to each other, optical digital transmission phases of the first low frequency band and the second low frequency band are opposite to each other, and optical digital transmission phases of the first high frequency band and the second high frequency band are opposite to each other.

12. The optical apparatus as claimed in claim 9, wherein:
the first left half cell includes a first unit layer a and a first unit layer b to form a first continuous left half cell synthetic layer ab;
the first right half cell includes a first unit layer b and a first unit layer a to form a first continuous right half cell synthetic layer ba;
the second left half cell includes a second unit layer b and a second unit layer a to form a second continuous left half cell synthetic layer ba; and
the second right half cell includes a second unit layer a and a second unit layer b to form a second continuous right half cell synthetic layer ab.

13. The c optical apparatus as claimed in claim 9, wherein:
the first left half cell includes a first unit right half ring a' and a first unit left half ring b to form a first left half cell adjacent half ring set a'b;
the first right half cell includes a first unit right half ring b' and a first unit left half ring a to form a first right half cell adjacent half ring set b'a;
the first left half cell adjacent half ring a'b set and the first right half cell adjacent half ring b'a set form an adjacent half ring a'bb'a set of the first cell;

the second left half cell includes a second unit right half ring b' and a second unit left half ring a to form a second left half cell adjacent ring set b'a;

the second right half cell includes a second unit right half ring a' and a second unit left half ring b to form a second right half cell adjacent half ring set a'b;

the second left half cell adjacent half ring b'a set and the second right half cell adjacent half ring set a'b of the form an adjacent half ring b'aa'b of the second cell;

the robust conjugate symmetric optical apparatus has a half ring structure including at least one of a linear structure and a curved structure; and on the condition that a path length of the half ring structure is equal to that of the other half ring structure, the two half ring structures are regarded equivalent.

14. A design method for a robust conjugate symmetric optical apparatus, comprising the following steps of:

providing a first optical cell set, wherein the first optical cell set includes a first plurality of cells, each of the first plurality of cells includes a first left half cell and a first right half cell, each of the left half cells includes a plurality of units, and the respective first right half cell and the corresponding first left half cell form a first symmetric structure;

providing a second optical cell set, wherein the second optical cell set includes a second plurality of cells, each of the second plurality of cells includes a second left half cell and a second right half cell, and the respective second right half cell and the corresponding second left half cell form a second symmetric structure;

causing the same either the first left half cell of the first optical cell set and the second right half cell of the second optical cell set, or the first right half cell of the first optical cell set and the second left half cell of the second optical cell set, wherein the first optical cell set has a first light cutoff band of a first reflection phase, and the second optical cell set has a second light cutoff band of a second reflection phase; and obtaining at least one of a first and second conditions as follows:

in the first condition, causing continuous either of the first light cutoff band and the second light cutoff band overlapping at least a part thereof, where the first reflection phase and the second reflection phase are opposite to each other; and in the second condition, causing mutually opposite any one phase pair of optical digital transmission phases of a first low frequency band and a first high frequency band adjacent to the first light cutoff frequency band, optical digital transmission phases of a second low frequency band and a second high frequency band adjacent to the second light cutoff frequency band, optical digital transmission phases of the first low frequency band and the second low frequency band, and optical digital transmission phases of the first high frequency band and the second high frequency band.

15. The design method as claimed in claim 14, wherein:

the first left half cell includes a first unit layer a and a first unit layer b to form a first continuous left half cell synthetic layer ab;

the first right half cell includes a first unit layer b and a first unit layer a to form a first continuous right half cell synthetic layer ba;

the second left half cell includes a second unit layer b and a second unit layer a to form a second continuous left half cell synthetic layer ba; and the second right half cell includes a second unit layer a and a second unit layer b to form a continuous second right half cell synthetic layer ab.

16. The design method as claimed in claim 14, wherein:

the first left half cell includes a first unit right half ring a' and a first unit left half ring b to form a first left half cell adjacent half ring set a'b;

the first right half cell includes a first unit right half ring b' and a first unit left half ring a to form a first right half cell adjacent half ring set b'a;

the first left half cell adjacent half ring a'b set and the first right half cell adjacent half ring b'a set form an adjacent half ring set a'bb'a of the first cell:

the second left half cell includes a second unit right half ring b' and a second unit left half ring a to form a second left half cell adjacent ring set b'a;

the second right half cell includes a second unit right half ring a' and a second unit left half ring b to form a second right half cell adjacent half ring set a'b;

the second left half cell adjacent half ring set b'a and the second right half cell adjacent half ring set a'b form an adjacent half ring set b'aa'b of the second cell;

the robust conjugate symmetric optical apparatus has a half ring structure including at least one of a linear structure and a curved structure; and on the condition that a path length of the half ring structure is equal to that of the other half ring structure, the two half ring structures are regarded equivalent.

17. The design method according to claim 14, wherein:

each of the first and second optical cell sets is a dielectric material, a conductor, or a semiconductor.

the robust conjugate symmetric optical apparatus further includes an intermediate substance, which includes NM units having a first number being greater than or equal to zero; and each of the NM units is a dielectric material, a conductor or a semiconductor, and the conductor includes a single layer of graphene or multiple layers of graphene.

18. The design method as claimed in claim 14, wherein:

the first left half cell includes a first unit layer a and a first unit layer b to form a first continuous left half cell synthetic layer ab;

the first right half cell includes a first unit layer b and a first unit layer a to form a first continuous right half cell synthetic layer ba;

the second left half cell includes a second unit layer b and a second unit layer a to form a second continuous left half cell synthetic layer ba; and the second right half cell includes a second unit layer a and a second unit layer b to form a second continuous right half cell synthetic layer ab.

19. The design method as claimed in claim 14, wherein:

the first left half cell includes a first unit right half ring a' and a first unit left half ring b to form a first left half cell adjacent half ring a'b;

the first right half cell includes a first unit right half ring b' and a first unit left half ring a to form a first right half cell adjacent half ring b'a;

the two adjacent half rings a'b of the first left half cell and the two adjacent half rings b'a of the first right half cell form an adjacent half ring a'bb'a of the first cell:

the second left half cell includes a second unit right half ring b' and a second unit left half ring a to form a second left half cell adjacent ring b'a;

the second right half cell includes a second unit right half ring a' and a second unit left half ring b to form a second right half cell adjacent half ring a'b;

the two adjacent half rings b'a of the second left half cell and the two adjacent half rings a'b of the second right half cell form an adjacent half ring b'aa'b of the second cell;

the robust conjugate symmetric optical apparatus has a half ring structure including at least one of a linear structure and a curved structure; and on the condition that a path length of the half ring structure is equal to that of the other half ring structure, the two half ring structures are regarded equivalent.

20. The design method as claimed in claim 1, wherein the robust conjugate symmetric optical apparatus meets both the first and the second conditions.

\* \* \* \* \*